US007063232B2

(12) United States Patent
Chirnomas

(10) Patent No.: US 7,063,232 B2
(45) Date of Patent: Jun. 20, 2006

(54) METHOD AND APPARATUS FOR STORING ARTICLES FOR USE WITH AN ARTICLE HANDLING DEVICE

(76) Inventor: Munroe Chirnomas, 47 Sky Line Dr., Morris Township, NJ (US) 07960

(*) Notice: Subject to any disclaimer, the term of this patent is extended or adjusted under 35 U.S.C. 154(b) by 388 days.

(21) Appl. No.: 10/215,101

(22) Filed: Aug. 8, 2002

(65) Prior Publication Data

US 2004/0026441 A1 Feb. 12, 2004

Related U.S. Application Data

(63) Continuation of application No. PCT/US01/16847, filed on May 23, 2001.

(60) Provisional application No. 60/206,363, filed on May 23, 2000.

(51) Int. Cl.
*B65G 59/00* (2006.01)

(52) U.S. Cl. .................................................... 221/92

(58) Field of Classification Search .................. 221/92, 221/95, 123, 221

See application file for complete search history.

(56) References Cited

U.S. PATENT DOCUMENTS 4,273,253 A 6/1981 Tanaka
5,240,139 A 8/1993 Chirnomas
5,651,476 A * 7/1997 Percy et al. ................ 221/131
5,761,877 A * 6/1998 Quandt ........................ 53/155
5,772,072 A 6/1998 Prescott et al.
5,957,326 A 9/1999 Ostgaard
5,971,205 A 10/1999 Michaels et al.
6,141,942 A 11/2000 Frederick et al.
6,253,955 B1 7/2001 Bower

FOREIGN PATENT DOCUMENTS

EP 1 093 094 A2 * 8/1993
EP 1 093 094 4/2001
GB 2 003 842 3/1979
WO WO 94 28700 12/1994
WO WO 96 28278 9/1996
WO WO 99 12132 3/1999

* cited by examiner

*Primary Examiner*—Donald P. Walsh
*Assistant Examiner*—Kenneth W. Bower
(74) *Attorney, Agent, or Firm*—Lawrence C. Edelman

(57) ABSTRACT

An article storage container, comprising a bin for storing in an a columnar manner, articles to be dispensed from a dispensing end of the bin. A plurality of article supporting intrusions positioned in a spaced manner along at least a portion of the length of the bin function to provide load bearing support for articles stored in the bin.

Sectional bins, bin sleeves and macro bins are also disclosed for facilitating rapid, accurate and efficient loading of articles into an article dispenser.

23 Claims, 32 Drawing Sheets

DOOR FACE CONFIGURATION 2

DOOR FACE CONFIGURATION 3

DOOR FACE CONFIGURATION 2

METHOD AND APPARATUS FOR STORING ARTICLES FOR USE WITH AN ARTICLE HANDLING DEVICE

CROSS-REFERENCE TO RELATED APPLICATIONS

This patent application is a continuation of and claims priority under 35 USC 120 of PCT/US01/16847, filed May 23, 2001, entitled METHOD AND APPARATUS FOR STORING ARTICLES FOR USE WITH AN ARTICLE HANDLING DEVICE, which itself claims priority under 35 USC 119 and 35 USC 120 of U.S. Provisional Patent Application No. 60/206,363, filed May 23, 2000, entitled METHOD AND APPARATUS FOR ARTICLE HANDLING, SUCH AS FOR A VENDING MACHINE. The entire disclosure of these applications, including the drawings, are hereby incorporated into this application as if fully set forth herein.

BACKGROUND OF THE INVENTION

1. Field of the Invention

The present invention relates generally to improvements in the design and operation of an article containment area, storage area and system therefore, for use with an article handling apparatus, and is particularly useful for storing, containing and/or handling fragile articles, such as bags of potato chips, in a columnar/stacked manner.

2. Description of the Prior Art

Most prior art article handling mechanisms, more specifically referred to in the description of the present invention as being in the environment of a point-of-sale (POS) article dispenser, rely on a multitude of motors, switches and solenoids for moving various portions of the handling mechanism, and handling of the articles themselves, such as packaged products. Most such machines require one motor, switch and/or solenoid dedicated for each row, column or type of article or package to be handled or dispensed therefrom. Such machines generally suffer from numerous disadvantages, such as poor reliability due to mechanical failures, as well known by those skilled in this art.

U.S. Pat. No. 5,240,139 represents a significant improvement in article handling devices. It describes the use of a negative air pressure lifter (i.e., article pickup or handling mechanism), which uses suction, i.e., a reduced or so-called "negative" air pressure created by a partial vacuum, for making a secure contact to an article to be retrieved by entering the open top of an article storage bin located in a refrigerated storage area of a vending machine. Although robotic, and specifically suction-type lifting mechanisms are in common use in factory settings, where space limitations are generally relaxed, their use in tight confines, such as an article vending machine, has not gained wide acceptance. Due to the greater reliability and versatility of vending machines of the type which utilizes suction technology for grasping and moving selected articles, it would be desirable to develop new techniques and methods for the operation and control of such machines, as well as for other more generalized article handling mechanisms.

Article storage is provided in the forenoted U.S. Pat. No. 5,240,139 by arranging a plurality of vertically aligned storage compartments or bins within the freezer. Since the articles to be dispensed were frozen, the weight presented on the articles stored in a lower portion of the bin, by the stack of articles stored above, did not present the problem of product crushing. In some applications, however, the articles stored in the bins may be fragile (such as potato chips which are packaged in flexible bags), and means would then be necessary to prevent crushing of the articles stored near the bottom of the bin. Even if article storage in the dispenser used horizontal placement of the article storage bins, fragile articles could still be damaged during transportation of the storage bins from the warehouse or article manufacturer to the actual dispenser mechanism. It is desirable to make the article storage bins so that they have the most capacity possible, for example, by making the bins taller. However, the taller the storage bins, the more the above noted crushing problem is exacerbated.

Furthermore, when the article storage bins store product which is date sensitive, i.e. may get stale overtime, means must also be provided to ensure that refilling/filling of partially empty bins are not only accomplished in a simple and reliable manner, but in a manner which preserves a proper ordering of the product in the bins, i.e. in a manner which maintains FIFO (first in, first out). FIFO dispensing of the product from the article storage bins, helps maintain the quality of the product at the time it is delivered to the consumer. When taller, higher capacity, bins are used, the FIFO problem is also exacerbated if access to the interior of the bins for refilling/filling is only provided at an end of the bin which is opposite from the dispensing end.

U.S. Pat. No. 6,082,578 entitled VENDING MACHINE FOR PACKAGED COMMODITIES discloses a vending machine wherein the articles to be dispensed are stored in vertical columns. In order to prevent the weight of the articles in the columns from crushing those articles near the bottom of the column, the vertical stack of products is divided into sections, with each section having its own article dispenser at the bottom thereof. Providing multiple dispenses to solve this "crush" problem is wasteful of the article storage volume, as well as requiring the use of many additional electromechanical components.

U.S. Pat. No. 5,772,072 entitled VENDING MACHINE INCLUDING REFRIGERATION AND OVEN COMPARTMENTS subdivides a vertically oriented article storage magazine into multiple vertically oriented sections. Each section includes a pair of opposed "retention levers" for engaging the bottom product in its section of the magazine. The "retention levers" are operated in a sequential manner in order to shift the stored products, one at the time of each vend, from a higher section to a lower section, until all of the products have been dispensed from the magazine. This technique would be somewhat undesirable for supporting articles comprising flexible bags, since the retention levers would have to extend quite far into the interior of the magazine in order to engage the bags in a supporting manner, and could therefore damage fragile products. Additionally, including a technique such as this in a system of the type described in the forenoted U.S. Pat. No. 5,240,139, it is likely that the retention levers would interfere with movement of the article retrieving mechanism into and out of the storage bins. Even furthermore, the retention levers add significant mechanical complexity to the storage bins.

U.S. Pat. No. 5,651,476 entitled MODULAR VENDING MACHINE and U.S. Pat. No. 3,175,669 entitled DEVICE FOR VENDING CYLINDRICAL OBJECTS are illustrative of the use of baffles along the inside portion of a vertical column of products, for staggering the distribution of the products in the vertical column, thereby preventing the weight of the products above from "bunching" or "jamming" a product feed mechanism located at the bottom of the column. The use of fixed position baffle elements are not sufficient to prevent damage to a column of fragile articles, such as a stack for bags of potato chips, and in fact the fixed position baffle elements themselves are likely to cause damage to the products.

It would be desirable to provide a relatively low cost and reliable method and apparatus to increase the article holding capacity of the storage bins without adversely affecting the overall quality (freshness and structural integrity) of the articles stored therein, as well as techniques which reduce the effect of external forces on the articles stored therein, such forces being presented to the articles during, for example, transportation from the manufacturer or a warehouse, to the storage area in the article dispenser.

Furthermore, it would be desirable to provide such an apparatus which not only prevents the crushing of fragile products, but also uses a method and apparatus which reduces the handling of the individual products during their transportation from the product manufacture to the article storage area of the article dispenser.

OBJECTS OF THE INVENTION

Accordingly, one of the general objects of the present invention is to provide new techniques and methods for the design, operation and control of article handling mechanisms.

It is a further general object of the present invention to provide new techniques and methods for the design, operation and control of article handling mechanisms used in association with computer-controlled electromechanical technology, and in the illustrated embodiment a robotically positioned suction-type gripper, for grasping and moving a selected article from a storage area to a dispensing area.

It is also an object of the present invention to provide new techniques and methods for such mechanisms which improve the speed and accuracy of the article handling operation while still handling the articles to be dispensed in a careful manner so as to prevent any damage thereto.

More specific objects of the present invention are to:

1) increase article storage capacity by increasing the height/length of a stack of articles, and manner so that forces which act upon the articles are prevented from causing damage, such forces comprising, for example the weight of the articles stored above or impact forces which result from shipping/transportation of the articles in a columnar form;

2) provide article storage bins which are designed so as to facilitate enforcement of the loading of articles in a FIFO manner;

3) provided a technique for prepackaging of the articles at a manufacturer's facility in a manner which reduces the labor and time it takes for restocking an article dispenser;

4) provide a support shelf or table in association with the dispensing apparatus which facilitates FIFO refilling/filling of the storage bins.

SUMMARY OF THE INVENTION

The above objects are achieved in the illustrative embodiment of an article handling apparatus embodied, for example, as a vending machine, including a controllably positioned hose gripper for retrieving articles from a storage area.

In one embodiment, the storage area includes a plurality of axially aligned storage bins having an opening at a dispensing end thereof, wherein each storage bin includes at spaced positions along its length, opposed intrusions adapted to support at least the edges of articles stacked in the bin. In one preferred embodiment of the invention, the intrusions comprise opposed pairs of tabs which extend from the inside wall of the bin into its article storage interior. The tabs are flexibly biased within the bin so as to facilitate movement of the articles in a direction towards its dispensing end, and which at the same time hinder movement of the articles in a direction which is opposite to the dispensing direction. In a specific embodiment of the invention, flexible biasing of the tabs is accomplished by attaching the tabs to the exterior the bin and having them extend into the interior of the bin via a hold in the bin wall. The thickness of the hole in the wall acts to create a support for the tabs which hinders movement of the tabs in a direction below the hole, while the whole as a height which is sufficient so as to allow the tabs to easily flex in a direction above the hole. The length of the tabs are predetermined so that the space between their opposed free ends is sufficient to allow the article gripping mechanism to freely pass therethrough, and the flexible biasing of the tabs is not strong enough to dislodge an article from the article gripping mechanism as a result of contact between the tabs and the article during removal of the article from the storage bin.

In accordance with a further embodiment of the invention, in order to facilitate an efficient refilling/filling of the storage bins with articles, and at the same time preserve a "first in/first out" (FIFO) refilling/filling scheme, the article storage bins may be segmented and pre-filled with articles at a warehouse, or even at the facility of the article manufacturer. The segments may comprise at least a portion of a shipping container from the manufacturer or warehouse for use in refilling/filling the article dispenser. Among other benefits, the use of bin segments preloaded with articles enable the operator of the dispensing apparatus to realize significant savings in time and labor during the restocking process, due to not having to take the previously un-sold articles from the storage bins back to the warehouse.

In an even further embodiment of the invention, the storage bins themselves may have a full height which is appropriate for the storage area, and sleeves comprising prepackaged groups of articles can be inserted into the storage bins for refilling/filling through an opening at or near a bottom portion thereof. The inserted sleeve of articles is then pushed upward in the bin, using a slot opening formed along one side of the bin, or the pressure from a "next to be inserted sleeve" thereby allowing insertion of additional sleeves of articles, as appropriate, for completely refilling/filling the bin. In one embodiment the sleeves may include flexible article supports, such as the above noted flexible support tabs, or in a further embodiment the sleeves may have appropriate openings on opposite sides or corners thereof, dimension to facilitate engagement between the edges of the articles within the sleeves and the flexible article supports in the bins.

In an even further embodiment of the invention, the article intrusions/supports can comprise a plurality of longitudinally oriented strips having "steps" formed therein. The strips can be adhered to the inner walls of the article storage bins and their "steps" function to at least partially support the weight of the articles stored therein. Alternatively, the inside of the bin could itself have a profile which acts to support the product, such as an internal spring portion extruded integrally with the formation of the bin walls.

DETAILED DESCRIPTION OF PREFERRED EMBODIMENTS OF THE INVENTION

Figure 1:
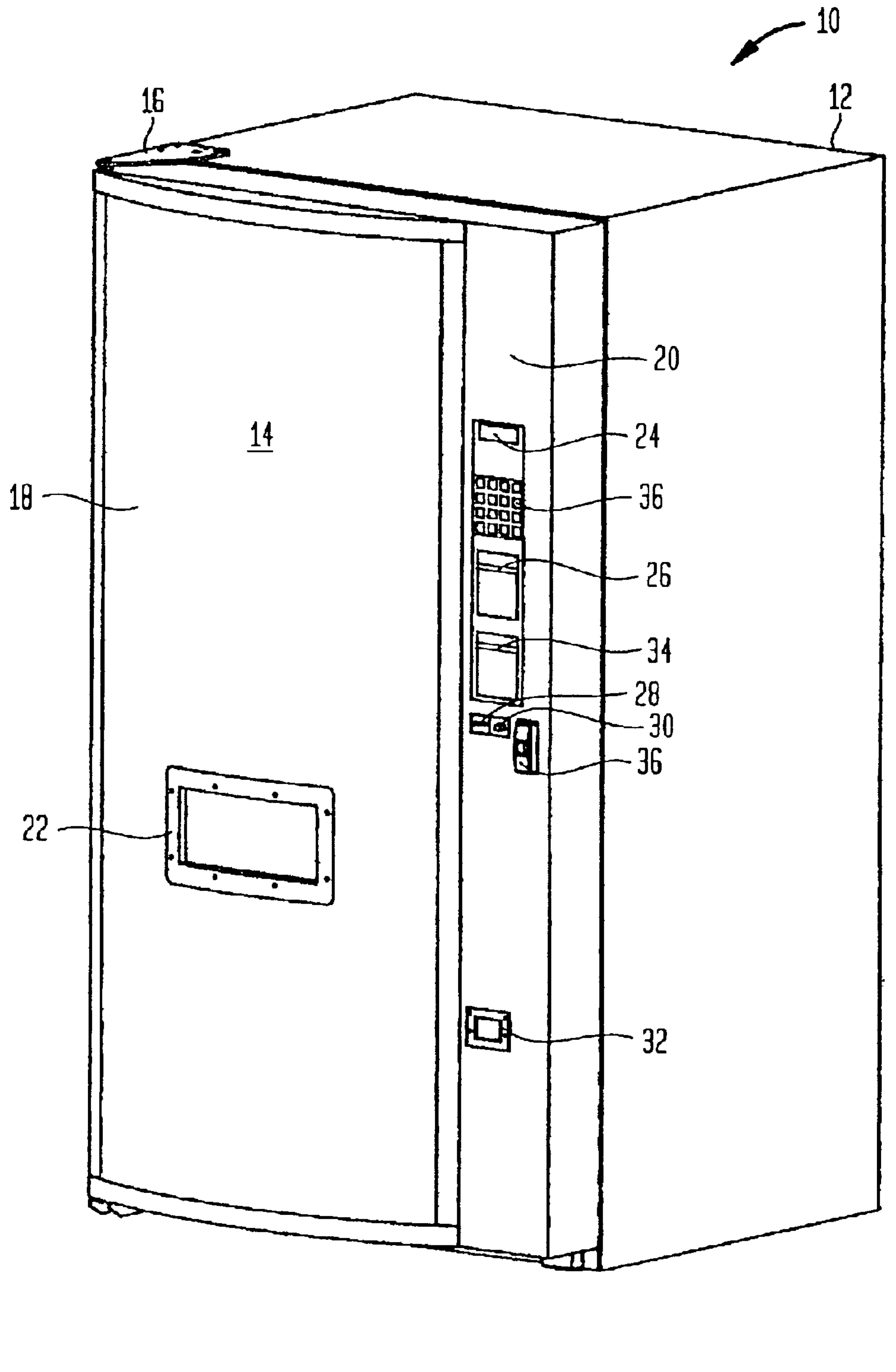
FIG. 1 is a front perspective view of a vending machine constructed and operating in accordance with the principles of the invention.

FIG. 1 illustrates an environment for the inventions described herein, in the form of an article dispenser, such as a point-of-sale (POS) dispenser. Although throughout the following description, reference is made to implementation of the invention in a vending machine environment, it is intended that the environment for the present inventions, and the term "vending machine", include more generalized article handling, retrieval and/or dispensing apparatus. Such apparatus, if embodied as a portable device may comprise and be about the size of a traditional vending machine or as large as a tractor-pulled trailer, and if embodied as a non-portable device may comprise and be embodied as an automated dispensing room or an area located in a permanent structure, such as in a building (aboveground or underground, and with or without interior walls or an enclosing cabinet). In this regard, the apparatus may comprise a small store, such as a convenience store. Furthermore, it is intended that the term "articles" or "products" include in at least some of the embodiments of the invention described herein, not only goods, but also services and/or information, in either a permanent or temporal form.

Accordingly, FIG. 1 illustrates a perspective view of a vending machine 10, comprising one embodiment for an apparatus which is constructed and operates according to the present inventions. Vending machine 10 includes a main cabinet 12 and a front door 14 mounted on a hinge 16 for providing access to the interior of the vending machine for servicing (refilling/filling it with articles, maintenance, etc.). Note, in a further vending machine embodiment, a service door or port could be positioned anywhere on or as a part of cabinet 12. In FIG. 1, front door 14 is shown in a closed position, forming an enclosure with main cabinet 12, within which various components of vending machine 10 are housed, as explained in more detail below.

Front door 14 includes a convex-shaped section 18 adjacent a flat section 20; however, these particular shapes are not necessary to the invention. The convex-shaped section 18 comprises a translucent plastic display panel 18, which typically has brand name and/or logo graphics displayed thereon, and may even include graphics which illustrate the individual articles that are vendible by vending machine 10, as well as the price and/or selection information for the articles. Panel 18 is typically back-lit using fluorescent bulbs, not shown.

A customer retrieval area 22 is formed in the panel 18 on door 14 so that articles stored therein can be discharged to a user of vending machine 10.

Various user interface features are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an aligned opening in flat section 20) for purchasing articles or for making change. A coin insertion slot 28 accepts coins into a conventional coin changer (also mounted inside machine 10 so as to have its user interface portion extend through an aligned opening in flat section 20) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through an aligned opening in flat section 20) for allowing a user to pay for purchases via credit/debit cards. A door lock mechanism 36 enables front door 14 to be secured so that it cannot be opened without a key. For allowing user selections, display panel 18 may include graphics, as noted above, which indicates the various articles vendible by the machine, as well as their associated price and unique selection number. Alternatively, flat section 20 could include a group of graphic article displays and their associated price. A conventional keypad push-button mechanism 38 is provided for enabling a user to select a desired article from vending machine 10. Alternatively, push-button mechanism 40 could include individual push buttons for each article selection, as well as an associated price display; and even furthermore, a user operated touch screen could replace pushbutton mechanism 40 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as more fully described later on. Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
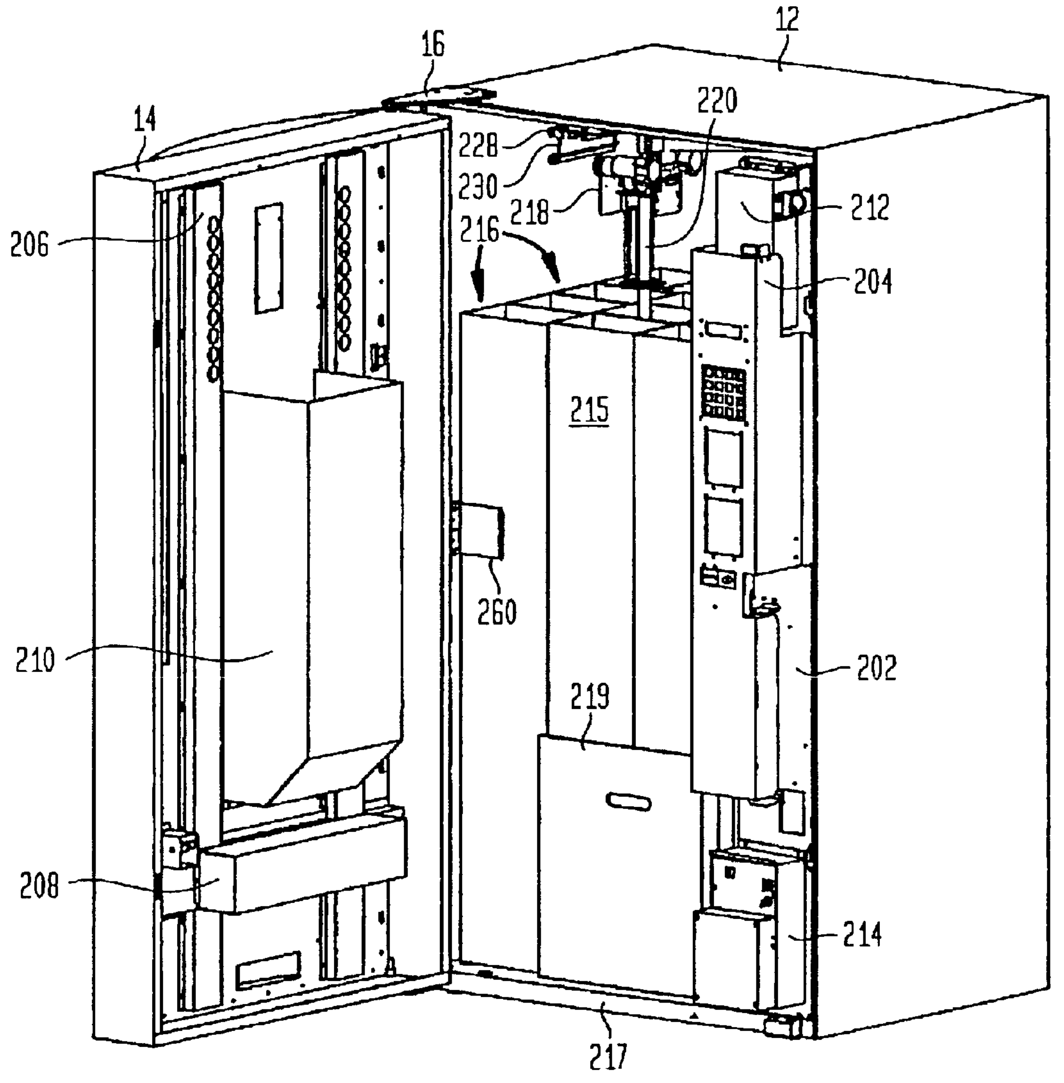
FIGS. 2 and 3 are front perspective views of the vending machine of FIG. 1, with the front door opened, so as to illustrate the main mechanical and electrical components therein.
Figure 3:
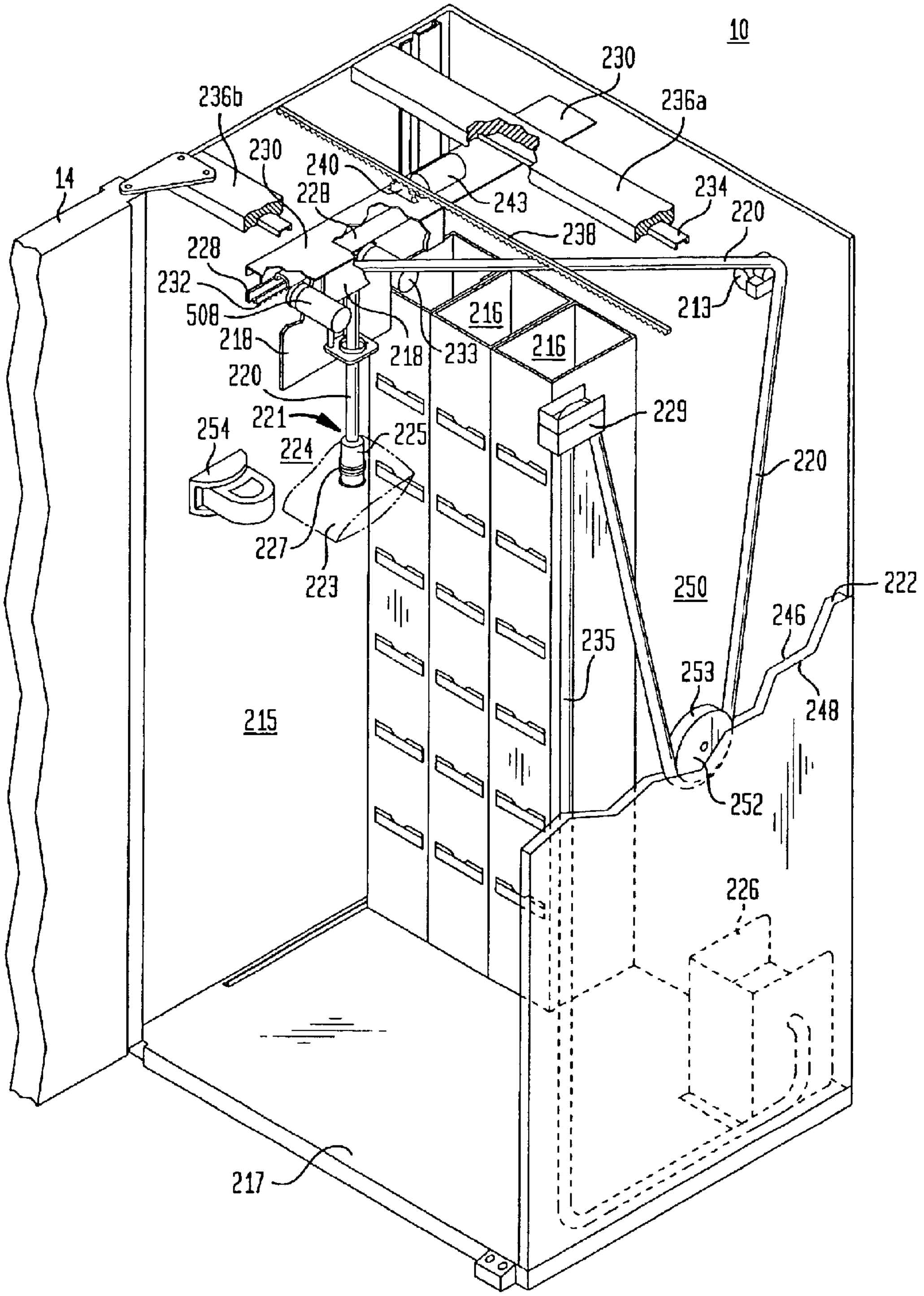

FIG. 2 is front perspective view of the vending machine of FIG. 1, with the front door open, so as to illustrate the main mechanical and electrical components therein. FIG. 3 is a somewhat idealized version of the main components of the article handling mechanism portion of vending machine 10, and is useful for understanding its general operation. Note, some portions of vending machine 10 are shown in these FIGURES cut away in order to better illustrate the interior components.

Referring first to FIG. 2, it is noted that the right portion of the front of cabinet 12 includes a vertically mounted support panel 202 which is used for mounting most of the user interface components. More specifically, a hinged mounting bracket 204 is mounted on panel 202 and aligned with an opening in door 14 so that the user interface components, such as the selection button keypad 40, coin insertion slot 30, bill acceptor slot 28, coin return 32, and customer display 24, are all accessible to the user from the front side of door 14. Mounted on the interior of front door 14 are two fluorescent bulb light sources which emit light for backlighting panel 18. The fluorescent bulb light sources are behind protective covers 206 so as to provide security (vandal protection), which is desirable as a result of the openings in the structure of door 14 which allow for insertion of the fluorescent bulbs. Also mounted on the interior of front door 14 is a ballast 208 for the fluorescent bulbs, and a product delivery chute 210 . . . Note, the product delivery chute 210 is unconventional in that it is extremely tall, and therefore serves as a security measure to prevent unauthorized access into the machine by insertion of an arm or other grasping mechanism into the customer retrieval area 22 from outside the machine. In typical prior art vending machines, a swinging security door is usually found at the top of chute 210, which swings into in a vandal blocking position when the customer pushes in the swinging door at the entrance to the product retrieval area 8. In a further embodiment of vending machine 10, such a swinging security door could be used in conjunction with product delivery chute 210, especially if chute 210 is not as tall as the one illustrated in FIG. 2 and also if the product retrieval area 22 is located higher up on machine 10. Mounted behind hinged mounting bracket 204 is a conventional bill acceptor mechanism for causing paper money inserted into bill acceptor slot 28 to be drawn into vending machine 10, a conventional coin changer supplies coins to coin return slot 34 and is located behind panel, a coin guide guides inserted coins into the coin changer, and a conventional bill validator ascertains proper insertion of paper money into bill acceptor slot 28

A control board 212 comprises a printed circuit board on which circuitry is formed and to which integrated circuit chips are attached. Control board 212 includes a microprocessor that is electrically connected to various sensors, motors, the above described user interface elements, as well as other devices within vending machine 10, to control the operation of vending machine 10 as described herein. When reference is made in this description to performance of specified functions by control board 212, it is to be understood that these functions are controlled by the microprocessor and the associated circuitry formed on control board 212. A power supply 214 is mounted on panel 202 and supplies power for the electrical components of vending machine 10.

Referring now also to FIG. 3, it is apparent that the bulk of the interior of cabinet 12 is available as an article storage area 215. In accordance with the principals of the present invention, storage area 215 includes a plurality of vertically aligned article storage bins 216 arranged on the interior floor 217 of cabinet 12. In a refrigerated environment for the present invention the bins could be arranged to sit on a shelf positioned above the refrigeration system. Bins 216 are specifically designed for supporting and storing fragile articles 223 to be vended by machine 10. Further details relating to bins 216 are provided later in conjunction with the description for FIGS. 5–10.

An open-top container 219 is dimensioned to hold a plurality of article storage bins 216 therein, and used, for example to facilitate the simultaneous handling (i.e., removal, installation and transportation) of the plurality of bins 216 into/out of the article storage area 215. Container 219 also facilitates rapid and accurate positioning of a plurality of the article storage bins into the storage area of the article handling apparatus. More specifically, the individual article storage bins can be pre-filled with fresh product and prearranged within the container 219 at a warehouse, and transported by the operator to the vending machine in order to rapidly, efficiently, and without error replace all or substantial all of the inventory of the vending machine by merely exchange a new container 219 with the old container 219 presently in the machine. The removed container 219 can then be replenish with fresh product by the operator back at his truck or at a warehouse, and then used for swapping in a subsequent vending machine. This "swapping" technique facilitates rapidly, efficiently, and without error changing all or part of the layout of the article selections, i.e., commonly called the "plan-o-gram", of the vending machine.

Figure 27:
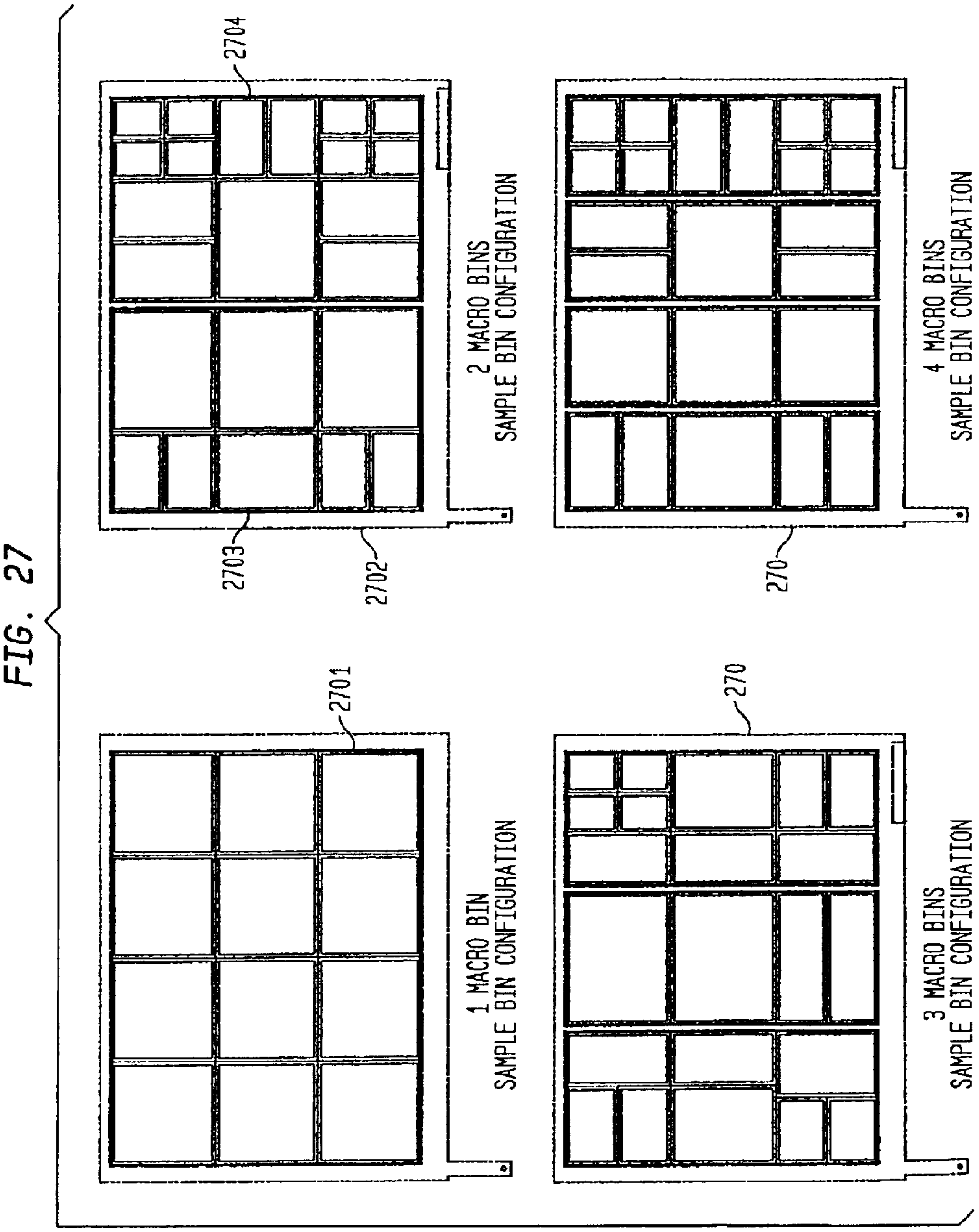

FIG. 27 illustrates a top view of 4 sample layouts for container 219, so as to hold article storage bins of varying sizes therein, as demanded by the shape of the articles to be stored therein.

A carriage 218 (which may be more generally referred to as an X-Y or planar positioning mechanism) is coupled to the interior topside of cabinet 12 and adapted for being controllably positioned by the control board portion 212 of machine 10, to a location centered over (so as to be aligned with) the open top-end of a selected one of article storage bins 216.

Although vertical (Z-axis) alignment of the article storage bins 216 is shown, non-vertical, i.e., slanted or even horizontal (X or Y axis) alignment may also be possible (such as found in the well know glass front vending machines of the type using a "spiral wire" type of dispensing apparatus). In the event of substantially horizontal alignment of the storage bins, the planar positioning mechanism will be appropriate changed so as to position carriage 218 for movement in the X/Z or Y/Z plane. In fact, a curvilinear plane, such as a cylinder, is also considered to be within the scope of the present invention. The combination of substantially horizontally aligned stacks of products with a robotically controlled article transport mechanism which moves in a vertical plane adjacent to dispensing ends of the stacks of products, is known, for example in U.S. Pat. No. 6,230,930 issued May 15, 2001 and entitled METHOD AND APPARATUS FOR VENDING PRODUCTS, and in U.S. patent publication US 2001/0000609 published May 3, 2001. The article storage bins of the present invention could find use in an article dispenser of the type noted above, which has bins positioned so as to have a downward slope toward their dispensing ends, since the article supports/intrusions in the bins will function, during transportation of the bins from the warehouse or article manufacturer to the article dispensing apparatus, to prevent damage of the products due to the weight of the products stored above, and in the dispenser apparatus these same article supports/intrusions can function to: 1) maintain an orderly position for the products throughout the length of the bin, such as provided by the spirals of a prior art vending machine (which is particularly important in the event that the packages are flexible, such as bags the potato chips), and 2) prevent the articles from sliding out of the dispensing end of the downwardly sloped bins.

Use of a curvilinear plane for article transport is also known, for example in the videocassette vending art, wherein the videocassette's are stacked in an outwardly facing manner in a central storage carousel, and a robotic gripper encircles the carousel. Furthermore, although article storage bins 216 are shown to be an ambient environment, bins 216 could in fact the positioned in a refrigerated environment, such as a freezer located in the bottom of storage area 217, and the article transport mechanism enter the bins from a top opening the freezer, such as shown and described in the forenoted U.S. Pat. No. 5,240,139. Alternatively, in the event the refrigerated environment is of the type including a substantially horizontal alignment of the storage bins, a vertically oriented opening could be used to provide access to the dispensing end of the article storage bins.

In the environment of the present invention, an air hose 220 is continuous from a point before it's exit from a hose storage area 222 over orthogonally positioned rollers 213 (or other low-friction arrangement), to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 (serving as an active suction cup) or a compliant tip without a weight Hose 220 has one end coupled to a source of negative air pressure, i.e., suction, which source of suction comprises in the preferred embodiment a blower motor 226, and a free end coupled to the article pickup head 224. In the present invention, the word continuous is intended to mean a hose which is connected and acts between it's end points, in order to accomplish the functions required by it, as a unitary/single hose, i.e., one than one hose can be coupled together to act as a single hose. An air hose portion 235 provides suction from blower motor 226 to one port of an air junction box 229, while continuous hose 220 is connected to a second port of air junction box 229. Air junction box 229, included at a top portion of hose storage area 222, includes an airflow sensor and vacuum breaker assembly. The airflow sensor is used to develop a signal which is applied to the controller of the vending machine and is representative of the airflow through air hose 220. The vacuum breaker assembly is used to quickly bring the air pressure in hose 220 to the ambient pressure, thereby facilitating a "quick-release" of an article transported by the article pickup head, into the dispensing chute 210. It is noted that a quick release of the products does not have to occur at the top of dispensing chute 210, and in the event that it is desirable to avoid subjecting the article to forces which result from jarring or dropping, the article pickup head could proceed to the bottom of the dispensing chute 210 before providing release of the article, with or without the use of the quick release valve. In one embodiment, the airflow sensor arrangement may comprises a two-part switch, a first part includes a reed switch mounted on a top portion of box 229, and a second part includes a magnet mounted at the free end of a swinging arm mounted inside box 229. As the arm swings inside box 229 due to changes in airflow, the switch is "toggled", thereby indicating changes in airflow. The use of this airflow signal will be described in greater detail later. In an alternative embodiment, the functions of the airflow valve and quick release could be built into the blower motor enclosure. With this arrangement, hose 220 would be continuous from the picker head all of the way to the blower motor.

In the environment of the present invention, as shown generally in FIG. 3, a novel hose positioning arrangement is provided for aligning carriage 218 with a selected one of bins 216. This alignment is accomplished in the front/back (Y) direction using a front/back linear slide 228 (shown in a cut away view) mounted to an "L" shaped front/back beam 230 so that carriage 218 can be controllably positioned therealong using slide 228. A bottom edge portion of beam 230 includes a rack portion 232 and carriage 218 includes an electric motor 233 that drives a gear (not shown) which engages rack portion 232. Application of forward and reverse motor control signals from control board 212 to motor 233 causes carriage 218 to be driven in the front/back directions. Alignment of carriage 218 in the left/right (X) direction is accomplished in a similar manner, using a left/right linear slide 234 which slidably couples the top side of front/back beam 230 to the underside of each of spaced apart left/right beams **236*a* and 236*b*. Beams 236*a* and 236*b* are rigidly attached to the inside top portion of cabinet 12. A rack 238, also rigidly attached to the top inside portion of cabinet 12 and in parallel with beams 236, is engaged by a gear 240 driven by a reversible motor 243 mounted near the inside corner of beam 230. Application of forward and reverse motor control signals from control board 212 to motor 243 causes a rotation of gear 240 and a corresponding movement of beam 230, and hence carriage 218**, in the left/right (X) directions.

Note that although carriage assembly 218 only moves in a single plane, it is responsible for precisely positioning pickup head 224 in each of the X, Y and Z directions. More specifically, carriage 218 includes a roller arrangement (not specifically shown, but which may comprise three orthogonally positioned rollers at the point where hose 220 enters carriage 218) for redirecting the movement of hose 220 from a substantially horizontal direction along the top interior portion of machine 10 (i.e., in the X,Y direction), to a direction perpendicular thereto (i.e., in the Z direction). Thus, movement of carriage 218 will move the free end 221 of hose 220 so that it can be axially aligned with a selected one of bins 216. Thereafter, a hose drive mechanism (not specifically shown, but which may comprise a set of conventionally operated "pinch rollers"), is driven by a reversible motor 508 for driving pickup head 224 into/out of the selected bin 216 in order to retrieve articles stored therein. In the illustrated embodiment the hose drive mechanism is mounted in carriage 218, but in a further embodiment motor 241 and the pinch rollers, or some other drive mechanism, such as an articulated arm, could be mounted so as to act somewhere else along the length of hose 220.

This arrangement, where hose 220 travels in the same X,Y plane that carriage 218 travels, facilitates a compact hose positioning and drive mechanism embodiment for the present invention.

Additionally, since hose 220 is formed of a continuous material from its connection to the source of suction at one end (which connection is described later in this description to be at a vacuum junction box 229) to the pickup head 224 at its other end, means are necessary for providing hose storage and/or retraction during travel of the pickup head 224 in the X, Y and Z directions during the article dispensing operations.

A hose storage area 222 is formed by placing an interior wall 246 parallel and adjacent to an exterior wall 248 of cabinet 12. Walls 246 and 248 are shown partially cut-away so as to illustrate a gravity feed self retracting loop 250 in hose 220. Loop 220 is constrained for movement within hose storage area 222, and made self retracting by providing a rolling weight 252 having a groove 253 along its periphery in order to provide constant centering of the weight within hose storage area 222 and providing a constant "loop forming" tension on hose 220. Furthermore, centering of the grooved rolling weight 252 within hose storage area 222 results in centering of hose 220, thereby preventing hose 220 from rubbing with the walls of hose storage area 222 during X,Y and Z repositioning of pickup head 224. In order to prevent binding of hose 220, rolling weight 252 is dimensioned so as to be slightly larger than the diameter of hose 220 and the width dimension of hose storage area 222 is dimensioned to be only slightly larger than the width dimension of rolling weight 252.

It is also noted that this gravity-based retraction/hose storage technique meets the storage requirements needed for both the X and Y movements of carriage 218 (left/right and front/back), as well as for the Z movement of pickup head 224. Of course this gravity-based retraction/hose storage technique would work equivalently well in an embodiment wherein the robotic hose positioning mechanism used a rotary type device (R, θ), an articulated arm, telescoping or scissor system, or other technique. Furthermore, the illustrated gravity-based retraction/hose storage technique is not necessary for the present invention, and in fact a fully or partially motorized retraction technique could also be used. Furthermore, in other embodiments, it may be desirable to place hose storage area at another location, such as parallel to the top or rear portion of cabinet 12.

In the environment of the present invention, it is noted that FIGS. 2 and 3 also illustrate that as the hose positioning arrangement causes an article 223 to be moved by pickup head 224 from a storage bin 216 to chute 210, it is positioned past an article identification (ID) device 254 mounted within cabinet 12. A specific type of article ID device is not required for the present invention, and depending upon system constraints, such a device may comprise, for example, a bar code scanner or other optical image/pattern recognition system, or even a non-optical system, such as a radio frequency identification (RFID), or magnetic-based system mounted within cabinet 12. for uniquely identifying and confirming that the article being dispensed is in fact the article that was selected. The construction operation of such article identification devices are well known to those of ordinary skill in this technology, and therefore further description in this regard is not necessary. Such article or bar code recognition uniquely identifies the transported article to control board 212, and can be used for inventory management, as well as operational control of vending machine 10. Article ID device 254 is mounted within cabinet 12 at a relatively fixed location, the mounting being such that some controlled movement in the orientation of article ID device 254 may be facilitated, in order to help ensure a good "view" of the article being transported, and a high confidence of the transported articles being identified. One way to provide such controlled movement for ID device 254 would be to mount it on a piezoelectric substrate, and control system 400 could provide a voltage to the substrate so as to shift the "view" of ID device 254. It is noted that by using an appropriately positioned article ID device 254, only a single article ID device 254 is needed. This is particularly useful for a robotic type dispenser, since the robotic apparatus can controllably position, and re-position if necessary, the article in the vicinity of the article ID device 254, thereby helping ensure a reliable ID of the article.

It is noted that by using a centrally positioned article ID device 254, only a single article ID device 254 is needed. This is particularly appropriate for a robotic type dispenser, since the robotic apparatus can controllably position, and re-position if necessary, the article in the vicinity of the article ID device 254, thereby helping ensure a reliable ID of the article. It is noted that a specific type of article ID device is not required, and depending upon system constraints, such a device may comprise, for example, a bar code scanner, an optical imaging system which identifies the article being dispensed using image and/or pattern recognition techniques, or even an RF identification tag system. Such article ID devices are well known to those of ordinary skill in this technology, and therefore further description of them is unnecessary.

A bin holder 260, shown in FIG. 2, comprising a pair of rectangular brackets secured in a spaced manner to opposed interior side walls of cabinet 12, is used to maintain the bins situated therebetween in a predetermined position relative to the interior of the vending machine cabinet. This is required in view of the pre-programming of control board 212 which controls the robotic structure for retrieving a selected article from one a selected one of bins 216.

Figure 4:
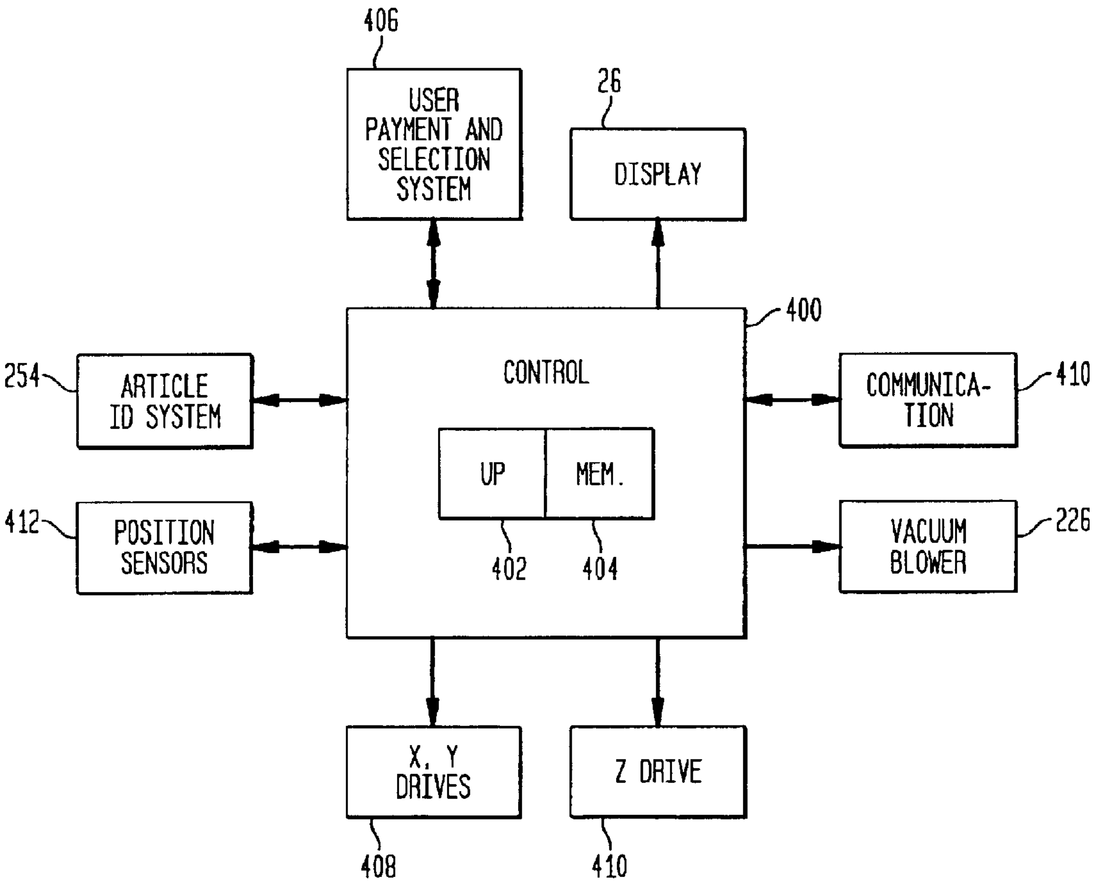
FIG. 4 is a functional block diagram illustrating the cooperation of the main mechanical and electrical components in the vending machine of FIG. 1.

FIG. 4 illustrates a functional block diagram of the general operation of a dispenser (vending machine 10) incorporating the various aspects of the inventions described herein. A control system 400 including a microprocessor 402 and associated memory circuits 404, is constructed on control board 212. Control system 400 may also include the electronic parts of other portions of vending machine 10, as appropriate. Memory circuits 404 include ROM for storage of operating programs (embedded software, as well known, for accomplishing the described herein control of vending machine 10), as well as RAM cache for temporary storage of operational data during system operation as well as other data as may be needed. Control system 400 is responsive to user operation of the user payment and selection system 406 (including the coin and bill mechanism 28 and 30 and the selection buttons 40 of FIG. 1) for operating the user interface and article handling apparatus of vending machine 10 so as to dispense the article desired by a user. More specifically, upon proper payment for a selection made by the user using payment and selection system 406, control system 400 operates the X/Y (left/right and front/back) drive motors 408 so as to position pickup head 224 to be in alignment with a bin 216 which holds the article selected by the user. Control system 400 then engages a hose drive motor 410 (Z-motor) mounted within and carried by carriage 218, so that hose 220 is driven in a direction towards the top article in the aligned bin. At an appropriate time before head 224 contacts the article to be removed (and in an embodiment of the invention where cabinet 12 does not include refrigerated air, an appropriate time may be just before head 224 enters bin 216, but if the air is refrigerated, just before contact with the desired article is expected, in order to minimize removal of refrigerated air), control system 400 activates blower motor 226 so as to provide lifting suction at pickup head 224. Upon position sensors 412 determining that pickup head 224 has contacted and become secured to the desired article, control system 400 causes hose drive motor 410 to reverse its direction so as to retract hose 220 from the aligned bin 216 and thereby lift out from the bin 216 the selected article. Carriage 218 is then driven to a position in alignment with the article delivery chute 210. As the desired article 223 is moved along its way from a storage bin 216 to chute 210, it is positioned past the article ID device 254 for uniquely identifying and confirming that the article being dispensed is in fact the article that was selected. Upon sensors 412 sensing alignment of carriage 218 with chute 210 (in this case sensor 202 may comprise a reed switch mounted on a front wall of the cabinet, and a magnet mounted at a leading edge of carriage 218), control system 400 turns off vacuum blower 226 and the resulting loss of vacuum causes the selected article to drop into the customer retrieval area 22. As previously noted, in the event that the articles are so fragile that they should not be dropped or subjected to such impact forces, hose 220 can be driven to the bottom of chute 210 before the article is released.

It is noted that position sensor 412 may include the airflow sensor of junction box 229, or in a further embodiment, comprise a mechanically operated plunger-type position sensor associated with pickup head 224. Even furthermore, position sensors 412 may also include a reed switch mounted on a front wall of the cabinet, and a magnet mounted at a leading edge of carriage 218.

Accurate control of energization of blower motor 226 is particularly advantageous in the event that the inside of the cabinet, or a portion thereof, is refrigerated, since accurate control would decrease the amount of refrigerated air being displaced by blower motor 226. In the preferred embodiment, the microprocessor 402 will energize blower motor 226 as the pickup head 224 approaches the desired article, and in fact only when it is in the immediate proximity of the desired article (and not earlier), due to control system 400 maintaining updated information about the height of the stack of articles in each bin 216. The height is assumed to be at a predefined level upon article refilling/filling of the vending machine 10 by the operator. Control system 400 may confirm the assumed height by moving the pickup head 224 at a reduced speed towards an article at the top of a bin 216 on the first retrieval attempt after the storage area has been refilled, and then compare the assumed height to the actual height. Memory 404 can be pre-programmed with specific article heights in advance, or the heights can be learned by control system 400 by comparison of prior vend heights in each bin. Once the height of the top article is known, control system 400 will be able to always know the height of the next "top" article in that bin. Subsequently, control system 400 may cause the pickup head 224 to approach the articles in that storage area at a higher speed, and only slow down when in the immediate proximity of the next "top" article in that bin. The technique to slow down upon the pickup head 224 approaching the next article also helps ensure that the stored articles will not be damaged by the pickup head 224.

It is noted that in an alternate embodiment, a simpler way of controlling operation of blower motor 226 and the approach of pickup head 224, without knowing the specific article height, would be to turn on the blower motor 226, or slow down the pickup head 224 just prior to the learned stack height of the prior vend.

When a "reset" switch (not shown) is activated by the machine operator, control system 400 automatically defaults to using the above height detection technique since it can be assumed that the operator may have changed the product load levels and consequently the product heights in each bin.

For the embodiments described herein, it is assumed that energization of the blower motor or other suction creating device, is meant to be equivalent to the appearance of a prompt package securing force, i.e., suction, at the pickup head 224.

A communication system 414 is connected to control system 400 so as to provide article inventory and vending machine operation information to a remote location, as well as to allow for control of the operation of the vending machine from a remote location. In this regard, communication system 414 may include a connection to means for making a wire-line and/or wireless transceiver interface through which a communication link with a remote computer can be established. Additionally, the communication system 414 may communicate with a plurality of other similarly connected vending machines in the same general area and communicate therewith using the wire-line interface or wireless communication. Even furthermore, communication system 414 can provide for communication with multiple vending machines and/or a local server/controller, in a local site along a LAN (local area network), LAWN (a local area wireless network) or a WAN (wide area network). The remote computer may comprise a database which receives and/or accumulates the operational data from one or more vending machines, which data is then accessible (via, e.g., the Internet, using a wired or wireless connection) using appropriate encryption, to others, such as route drivers, machine operators, machine owners, product suppliers, etc. Furthermore, the remote site may give feedback to the vending machines, such as authorization information, which can control its operation, such as allow its continued operation.

In the embodiment illustrated herein, blower motor 226 provides a relatively high volume of airflow but relatively modest negative air pressure. The illustrated embodiment is particularly useful for picking up flexible packages since a momentary or even sustained leak in the coupling to the packaging to the article will generally not result in dropping of the package, while at the same time offering extreme versatility due to the ability to pick up a wide variety of shaped objects of varying weight and size. In some applications it may be advantageous to provide a negative air pressure source which provides a relatively substantial negative air pressure but low rate of airflow, such as is provided by a vacuum pump, alone or in combination with a storage tank couple to the suction hose via a valve and air hose. Alternatively a compressor could be used in combination with a venturi device to create a vacuum. To get operational performance with a vacuum pump that is similar to that of blower motor 226 would require a storage tank and/or vacuum pump of substantially larger size.

Alternative embodiments for the robotic hose positioning mechanism described above are contemplated to be within the scope of the present inventions. For example, instead of using a combination of left/right slides 234 and support beams **236*a* and 236*b*, a roller/guide rail combination could be used. Support beams 236*a* and 236*b* may comprise a support plate having two outwardly facing, i.e., opposed, L-shaped rails, along its edges. The function of slides 234 could be accomplished by fixing a pair of brackets to opposed ends of beam 230, each bracket including a pair of spaced apart and inwardly facing rollers which engage and follow the opposed rails on the support plate. Furthermore, the spaced apart and inwardly facing rollers could each comprise a set of rollers positioned to be angled 90 degrees with respect to each another, so as to engage or follow the two orthogonal surfaces of the L-shaped rails. Such arrangement may result in a coupling of carriage 218 to beam 230** which needs less adjustment for proper operation.

Furthermore, as previously noted, the event of substantially horizontal alignment of the storage bins, the robotic hose positioning mechanism can position carriage 218 for movement in a vertical plane which is substantially flat (i.e., in the X/Z or Y/Z plane) or in fact a vertical curvilinear plane. Additionally, as previously noted, in some aspects of the invention, it may be desirable for the robotic hose positioning mechanism to include a rotary device (R, θ) of the type including an I beam of fixed length (or telescopic sections), for establishing the "R" movement of the gripper/pickup head, which pivots for establishing the "θ" movement. Alternatively, in other environments for the invention the robotic hose positioning mechanism may include an articulated arm or scissor system, or other technique.

Furthermore, the inventions described in the illustrated embodiments could also be of benefit in apparatus using other types of robotic positioners, such as a rotary type device (R, θ), an articulated arm, telescoping or scissor system, etc, as may be beneficial in a specific combination of the various elements described herein.

Even furthermore, although only a single storage area 215, hose 220 and carriage 218 are shown in the illustrated embodiment, the invention described herein could also be used in a dispensing apparatus/article handler of the type having multiple storage areas and/or robotic article handling mechanisms, such as two robotic mechanisms (both positioned vertically or horizontally or mixed, and one vertically and one horizontally) each one serving a different storage area. Furthermore, when multiple article handling mechanisms are provided, each can be tailored for a particular operation. For example, one may have a relatively large diameter pickup head and use a high airflow/modest suction vacuum supply device, while the other may have a relatively small diameter pickup head and use a low airflow/high suction vacuum supply.

Figure 5:
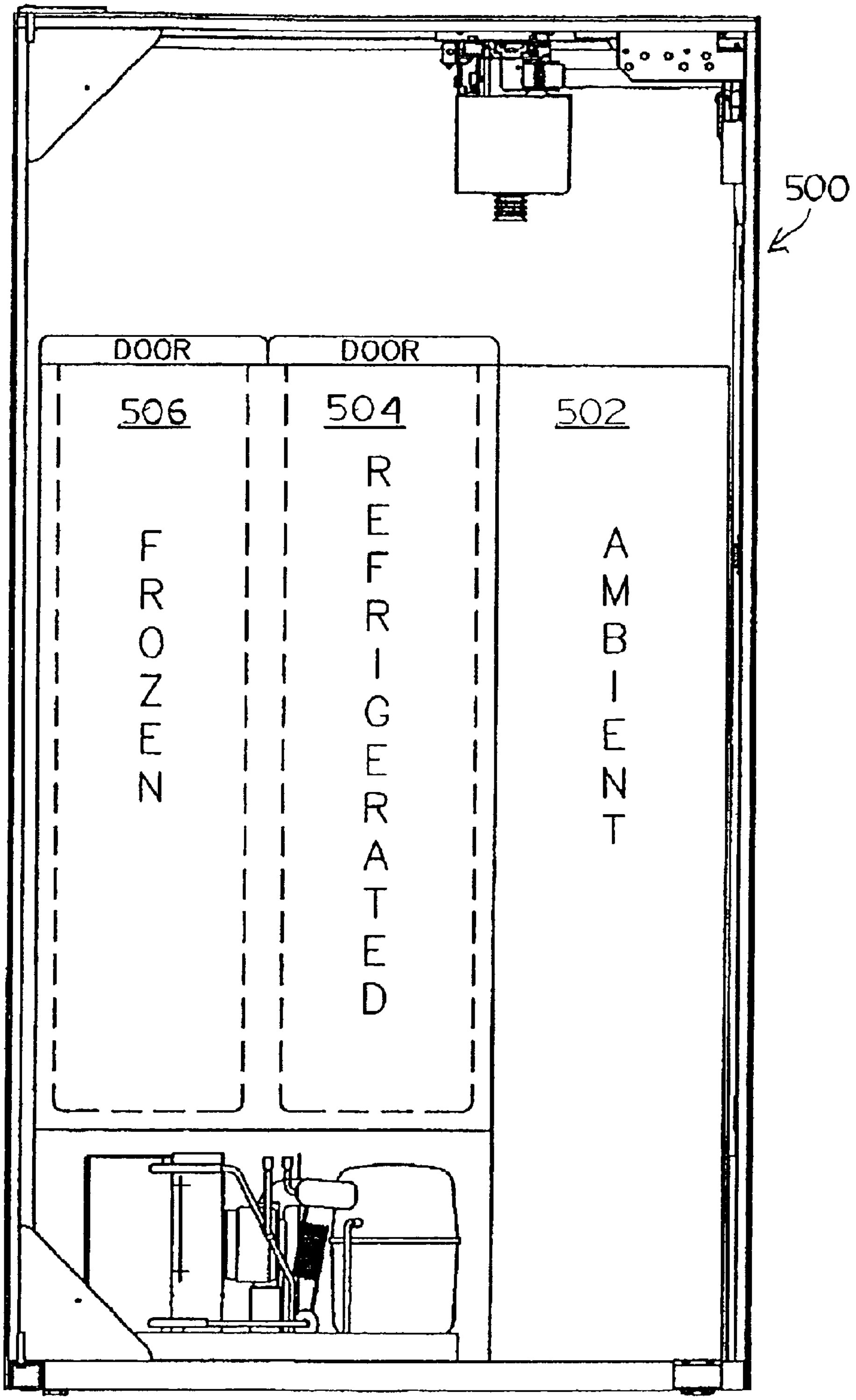
FIGS. 5, 6, 7, 8 and 9 illustrate combinations/orientations of various article handling mechanisms and storage areas.

In this regard, FIG. 5 illustrates a multiple storage area arrangement 500, where a single article handler of the type previously noted serves 3 adjacent storage areas. In one embodiment each area may be for storing stacks of articles aligned in the same direction as in the other areas. One storage area 502 may have an ambient environment, while the other storage areas may be cooled, e.g., one area 504 being refrigerated and one area 506 being frozen. This arrangement may typically find use for dispensing in a compact, reliable and efficient vending structure: salty snacks (such as bags of potato chips) from the ambient storage area, cooled drinks (such as soda) from the refrigerated storage area, and frozen snacks (such as ice cream) from the frozen storage area. Furthermore, an arrangement of this type may be particularly advantageous in that the frozen compartment can be used for maintaining the quality of the stored articles until they are close to being needed for dispensing, as determined by an intelligent controller. At a predetermined appropriate time before dispensing, a certain amount of articles can be moved from the frozen area to the refrigerated area. This technique also finds particular advantage in the event that the third storage area is in fact a temporary storage area which is used for individually heating/cooking the articles, such as, e.g. frozen pizzas, using an oven or microwave. In this case the quality/shelf life of the frozen pizza is maintained by not moving them to the refrigerated area until the refrigerated area has been depleted to the point that it needs replenishment, at which time they are sequentially moved from the frozen area to the refrigerated area. This technique substantially reduces the time needed for heating the pizza while the customer is waiting, while at the same time allowing for storage of the pizza in a frozen manner, thereby substantially increasing its shelf life and reducing the labor costs involved in stocking the machine. In this arrangement, the refrigerated storage areas can include thermal separators at their top portions, such as an air curtain or sliding thermal panels.

Figure 6:
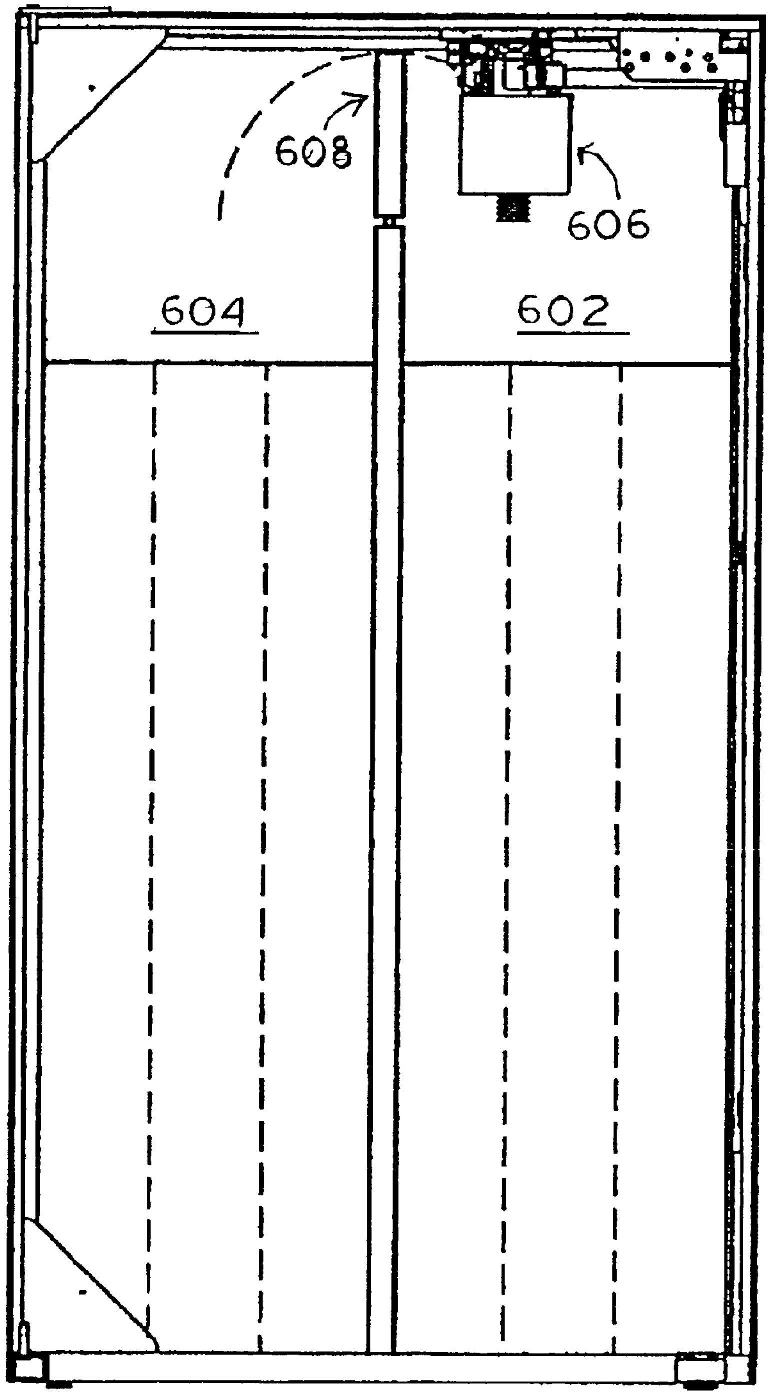

FIG. 6 illustrates an arrangement where the single article handling mechanism services two horizontally aligned in article storage areas, area 602 being an ambient environment and area 604 being a refrigerated environment. The article handling mechanism 606 can be constructed in a manner such as previously described using support beam 230 and carriage 218 so that mechanism 606 can "live" in the ambient area 602, and travel into the refrigerated area 604 through swinging door 608 as needed. Areas 602 and 604 can each include their own article ID device 254 or share a common ID device.

Figure 7:
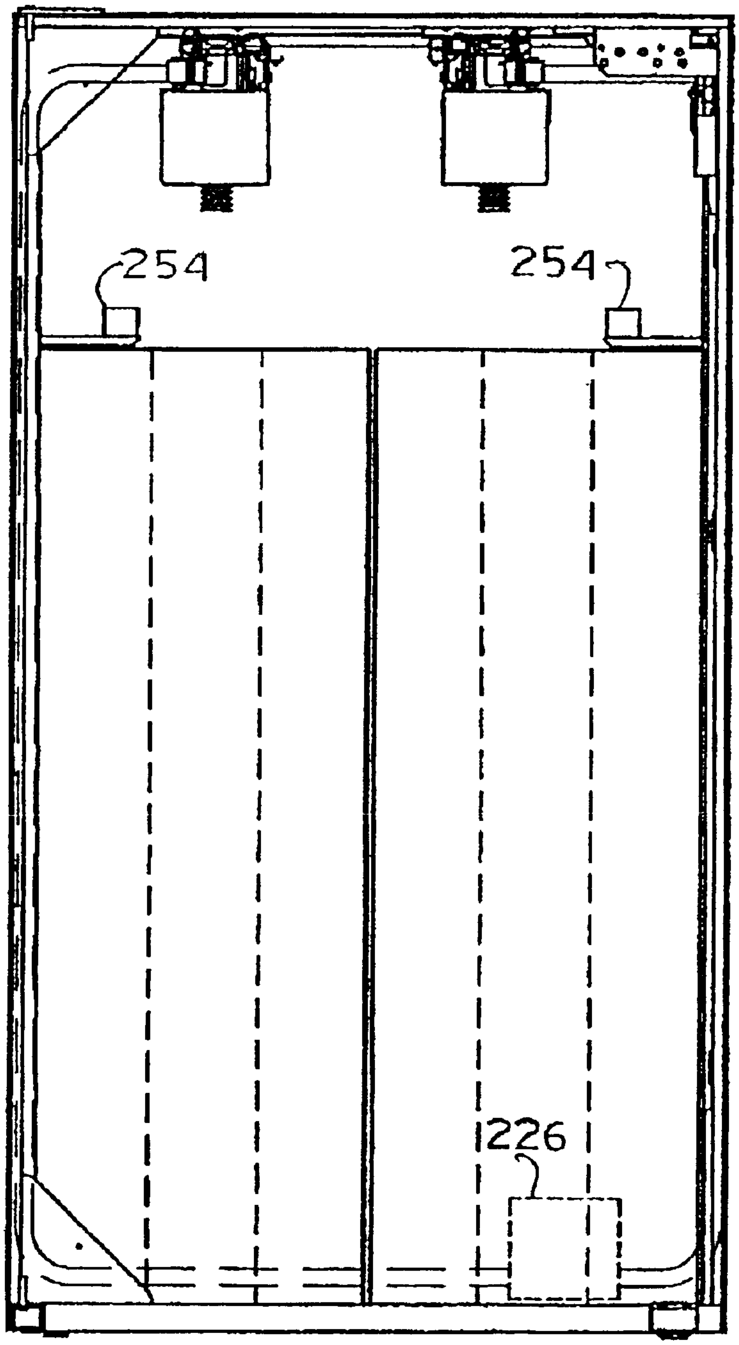

Additionally, separate hoses and hose positioning mechanisms can also be useful in order to speed up retrieval and delivery of stored articles to a customer. FIG. 7 shows such as a rapid article dispenser, of the type having two horizontally displaced storage areas. Although separate hoses and hose positioning mechanisms are used, they may share a single source of suction (e.g., blower motor 226), airflow sensor and vacuum breaker. A single hose, hose positioning mechanism and hose storage area could be used in a further embodiment where the single hose services more than one article storage area, such as the refrigerated and non refrigerated storage areas shown in FIG. 7, wherein support beam 230 and carriage 218 are positionable between the two storage areas having different ambient environments. Each robotic article handling mechanism could have its own article ID device 254, or they could share a single article ID device 254.

Figure 8:
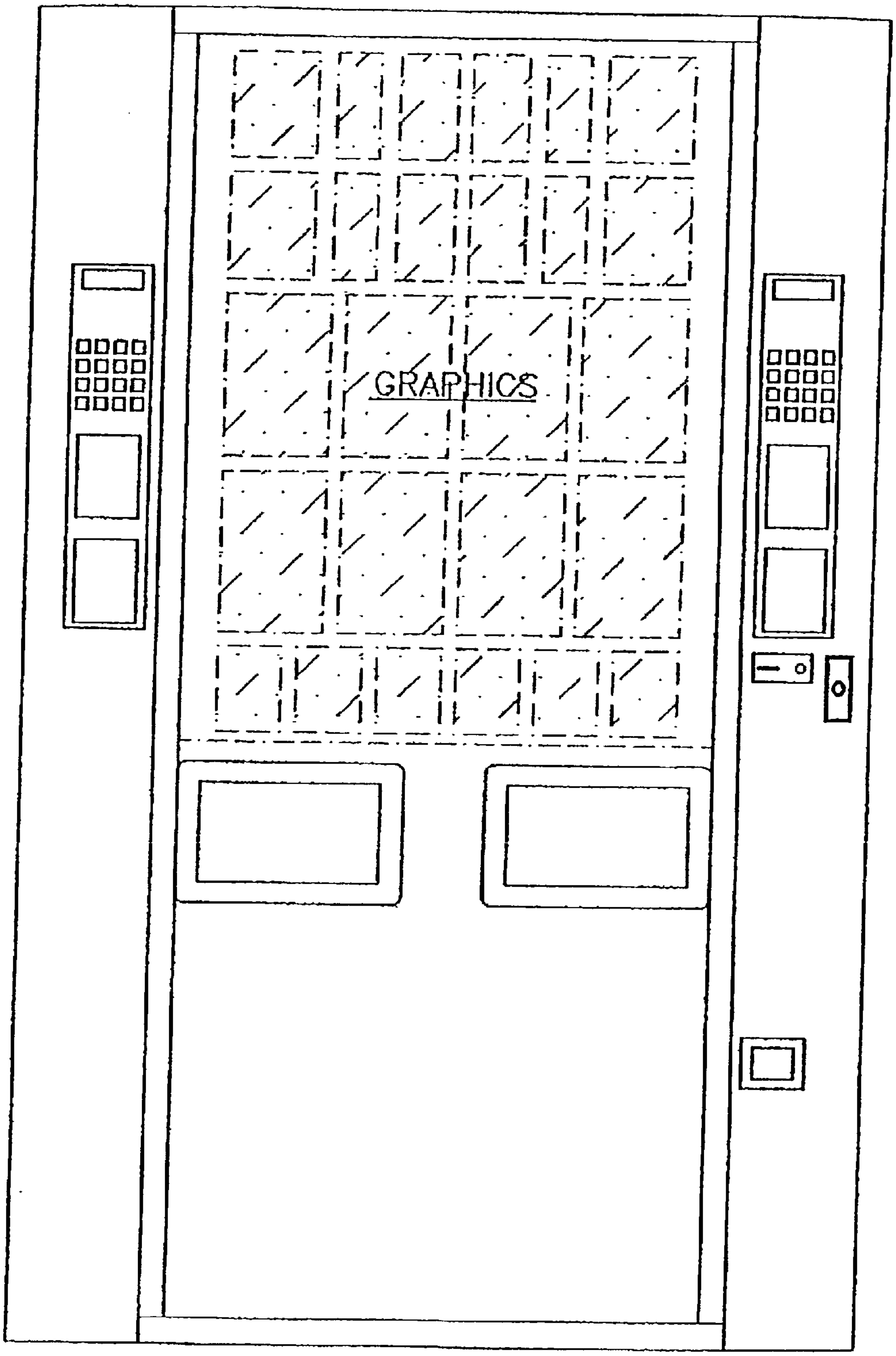

FIG. 8 illustrates a vending machine having a single article handling mechanism with dual customer interface areas (each including a product selection apparatus such as a keypad or touch screen, payment system, and product retrieval door), for example, one on the left side and one on the right side, with a common graphics display therebetween. This machine can service two purchasers at substantially the same time since customer selections and payment typically take a substantial amount time compared to the actual time needed for the dispenser to deliver the selected product.

Figure 9:
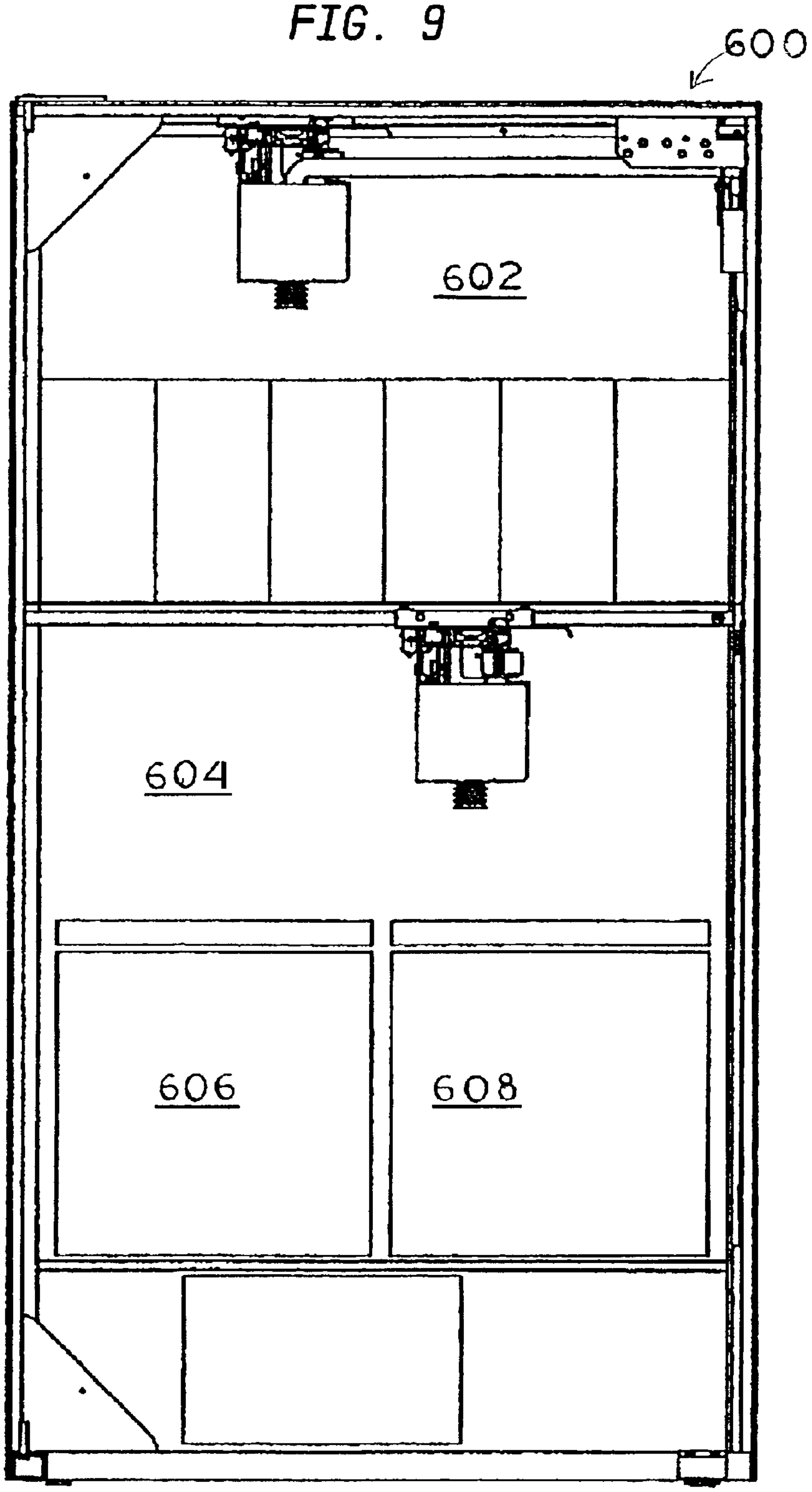

A further one of such arrangements is shown in FIG. 9, where cabinet 600 includes therein an upper area 602 which is non-refrigerated (and may even be heated) and a lower area 604 which is refrigerated (and may even be divided into, e.g., two additional sections, one area 606 being frozen and another area 608 being merely cooled). This arrangement is particularly advantageous since hot air tends to rise and cool air tends to sink. Alternatively, one storage area may be oriented for vertical storage of products and the other one, or even multiple ones, arranged for horizontal storage. In this case a separate hose, hose positioning mechanism and hose storage area may be required for the differently oriented storage areas.

In the above arrangements it is noted that the article handling mechanism can have other configurations such as the forenoted telescopic tubing, scissors, or R,theta arrangement Additionally, the articles can be consumer goods, such as office supplies, printer cartridges etc.

Figure 10A:
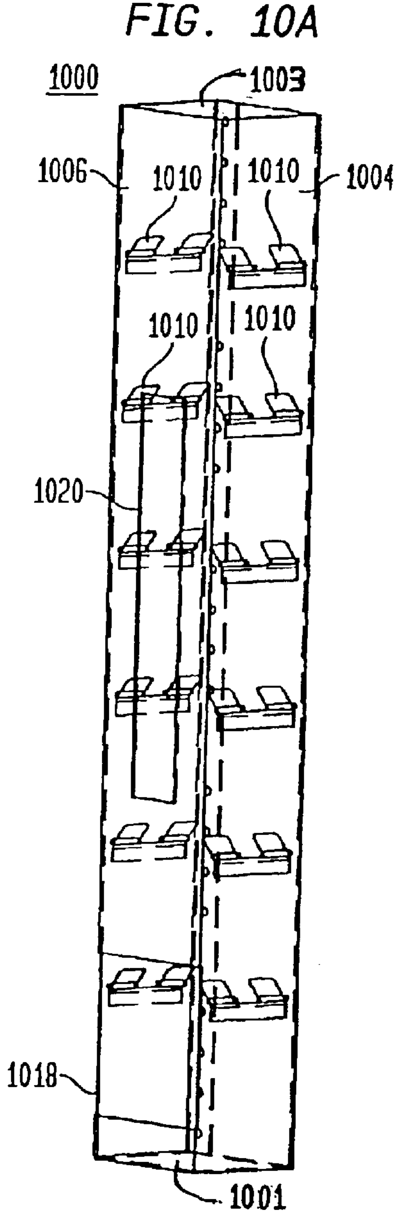
FIGS. 10*a*, 10*b*, 10*c*, 10*d* 10*e*, 10*f*, 10*g*, 10*h*, 10*i* and 10*j* illustrate perspective side section, front section, and top views, of article storage bins and article supports therefore, constructed and operating in accordance with the principles of the present invention.
Figure 10B:
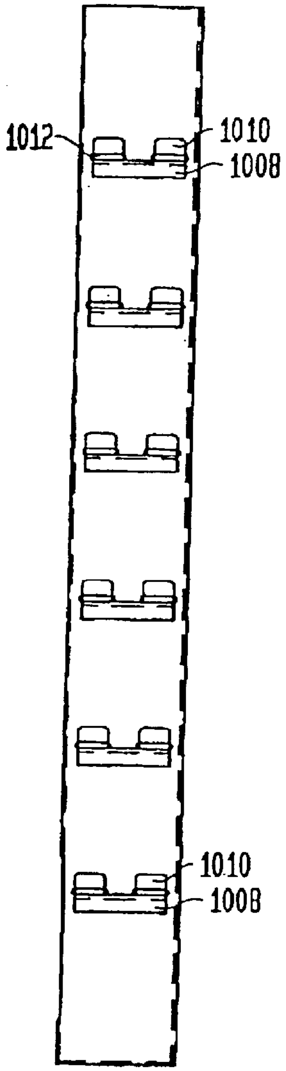
Figure 10C:
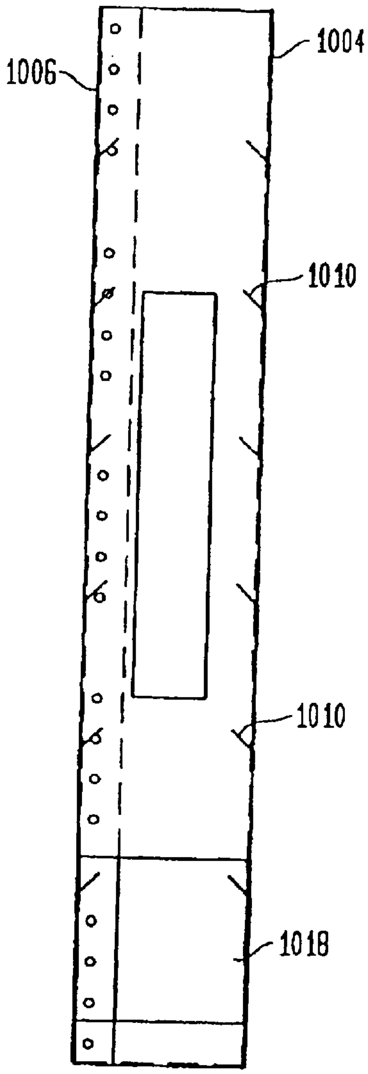
Figure 10D:
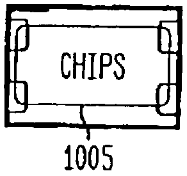
Figure 10E:
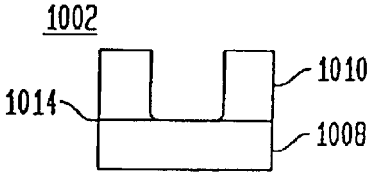

Referring simultaneously to FIGS. 10A, 10B, 10C, 10D and 10E, one type of an article storage bin constructed and operating in accordance with the principles of the present invention is shown. These Figures illustrate a perspective view, a side section view, a front section view, and a top view, respectively, of one embodiment of the storage bin, and an article support used in conjunction with the article storage bin in accordance with the invention. The single storage bin 1000 illustrated, corresponds to one of the storage bins 216 illustrated in FIGS. 1–3. In one embodiment, storage bin 1000 comprises an elongated columnar storage magazine having a base 1001, an open top 1003, and a rectangular cross-section dimensioned to hold a particular type of product therein, such as a bag of potato chips 1005 as illustrated in FIG. 10D. Considering that a typical vending machine has a height of approximately 6 feet, storage bins 1000 could have a height of about 4½ feet, leaving 1½ feet for movement of hose 220 and carriage 218, as well as clearance between the top of the bins and the bottom of carriage 218 for allowing removal of the articles from the bins. If protective measures in accordance with the principles of the present invention were not provided, such a stack of fragile articles would result in the lowermost articles in the stack being damaged do to the effects of gravity causing the weight of the products stacked above to crush or otherwise damage those products stacked below. Accordingly, in accordance with the principles of the present invention "edge catching" article supports 1002 (an individual one of which is shown in FIG. 10E are provided on opposed walls 1004 and 1006 in a spaced manner along the height of bin 1000. Article supports 1002 comprise a generally U-shaped flexible plastic sheet, having a base portion 1008 and two extending tab portions 1010. Walls 1006 and 1004 include pairs of slots 1012 along their length which are dimensioned for receiving tab portions 1010.

Conventional techniques can be used for forming the basic shape for article storage bins 1000 and slots 1012. Automatic assembly equipment can be used for inserting the tab portions 1010 into the interior of the bin and securing the base 1008 of article supports 1002 to the exterior of the bin walls using an adhesive applied to base 1008. Article supports 1010 are manufactured with a crease 1014 across their width so that tab portions 1010 operate as a flap. Note that the length of tabs 1010 is such that significant space is available between the tabs intruding into the interior space of bins 1000 so that the article gripping mechanism (which in the previous FIGS. comprises a suction pickup head 224) and pass therethrough in an uninterrupted manner, yet they are long enough so as to catch opposed edges of the article packaging 1005 (shown in FIG. 10D). Furthermore, the base portion 1008 of article supports 1002 is adhered to the lower portion of the openings in walls 1004 and 1006, in a manner so that the thickness of the hole in the wall of the bin at the lower edge of each of slots 1012 "bias" tabs 1010 in an upwardly facing direction. Constructed and assembled in this manner, tabs 1010 will have a resistance to bending in the downward which will be greater than its resistance to bending in the upward direction. Accordingly, tabs 1010 will tend to support the gravity induced weight of the articles when they are stored in bin 1010; however, at the same time tabs 1010 will present very little resistance to the articles as they are removed from the bin during the dispensing process (where the picker head grips the selected article and moves in a direction opposed to gravity), so as to thereby not loosen the grip by the pickup head on the article being transported. The number of pairs of article supports needed along the height of each bin is a matter of designed choice, and may depend, for example, on the weight of the articles.

To facilitate loading of bins 1000 with articles to be dispensed, in one embodiment of the invention, sidewall 1016 includes openings 1018 and 1020. In operation, since retrieval of products is from the top of the bin, loading of the bin must take place from the bottom in order to preserve a first-in, first-out (FIFO) product dispensing. Accordingly, the service person will insert the articles into the larger opening 1018 at the bottom of bin 1000 and then using his/her hand, push them upward in the bin. Opening 1020 is provided to assist movement of the inserted products towards the top of bin 1000. In an alternative embodiment, base 1001 may merely comprise an opening, it may comprise a pair of article supports 1010, or even one large flexible support which has a shape substantially similar to the cross-sectional shape of bin 1000, in order to help bin 1000 keep its rectangular shape.

Figure 10F:
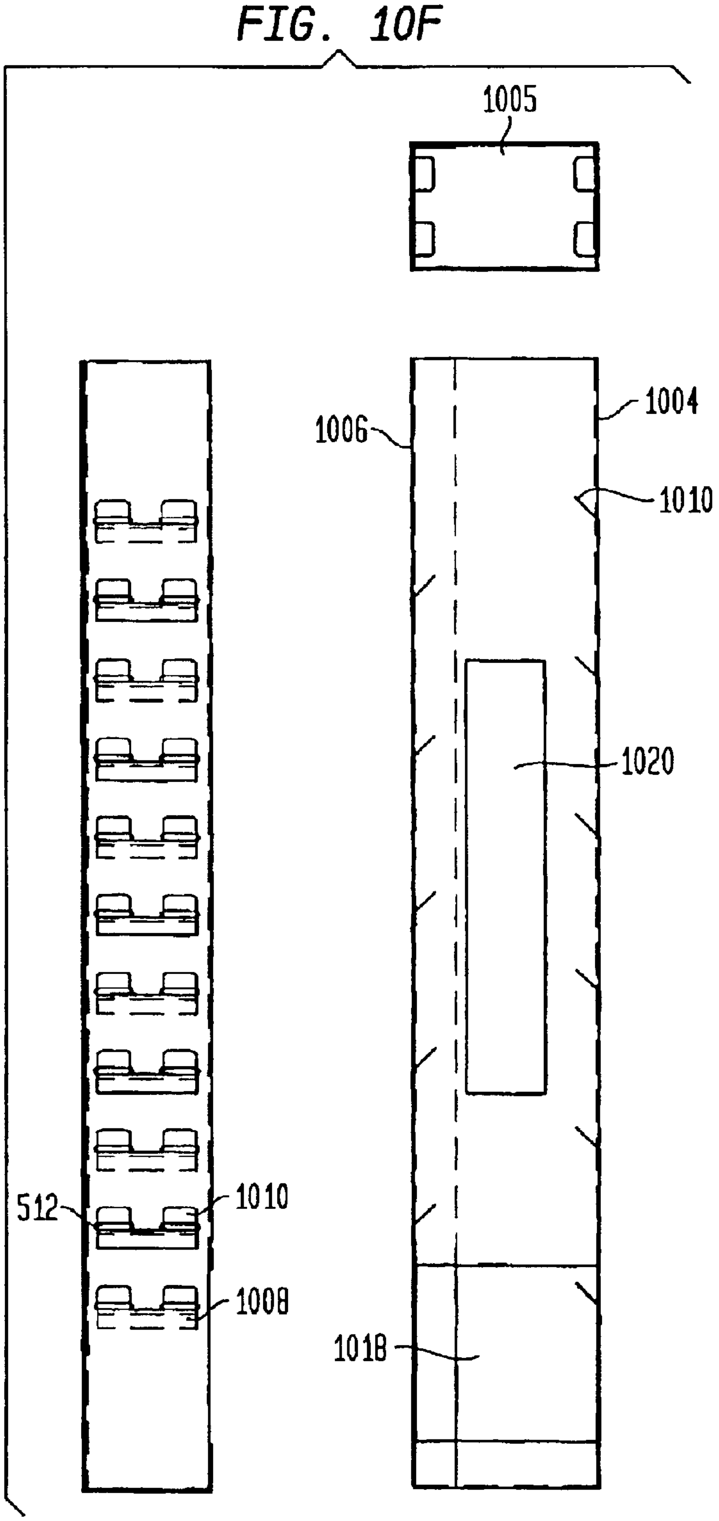
Figure 10G:
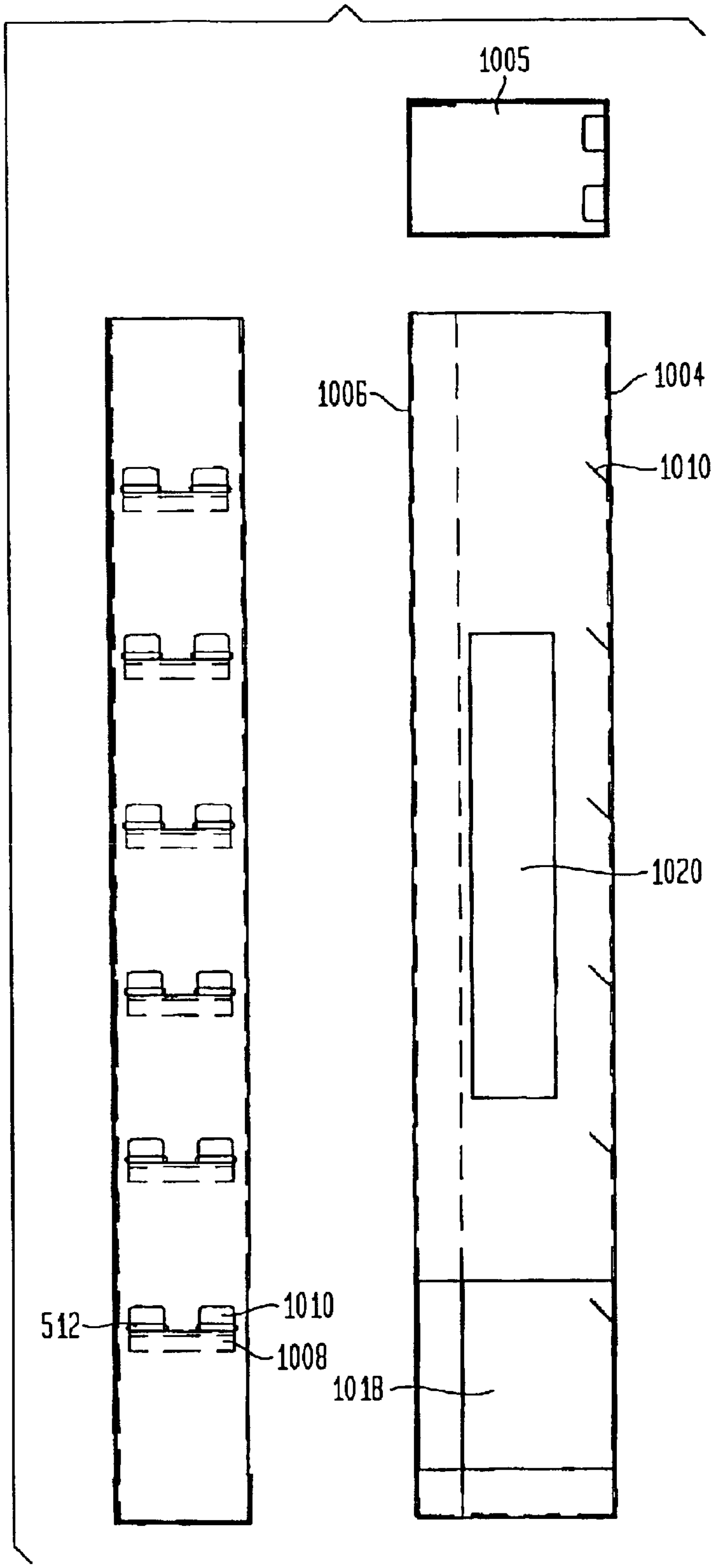
Figure 10H:
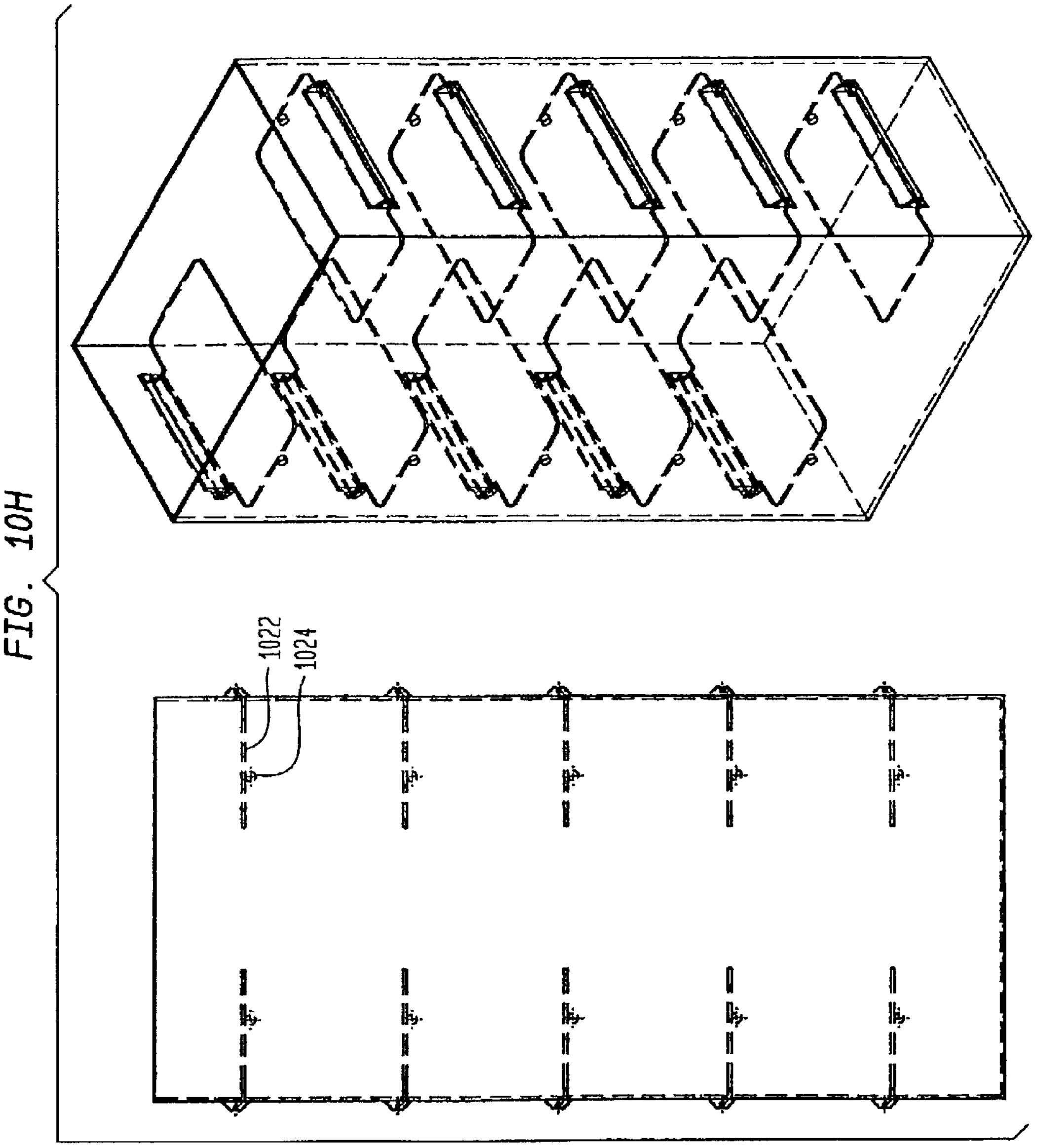
Figure 10I:
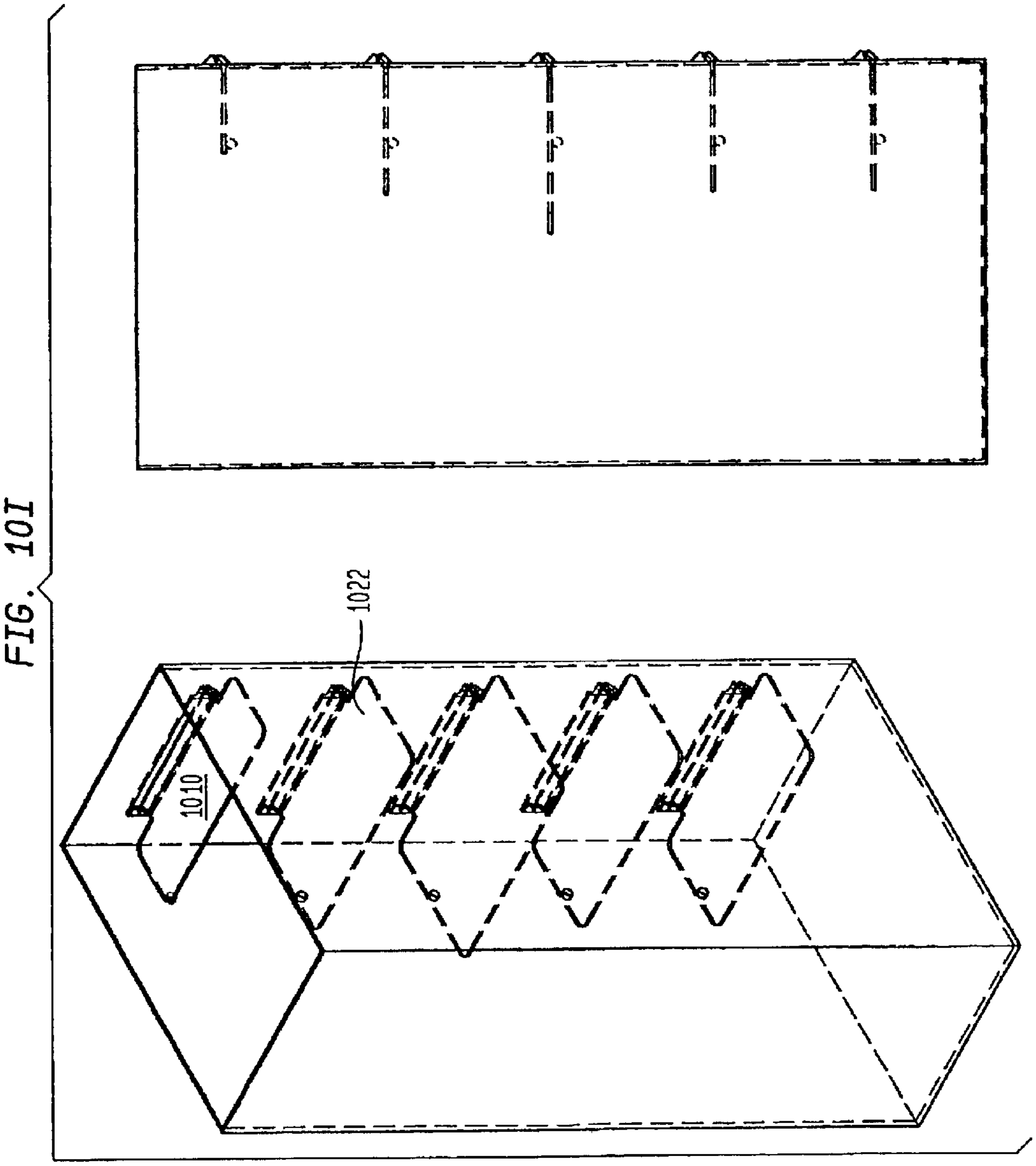
Figure 10J:
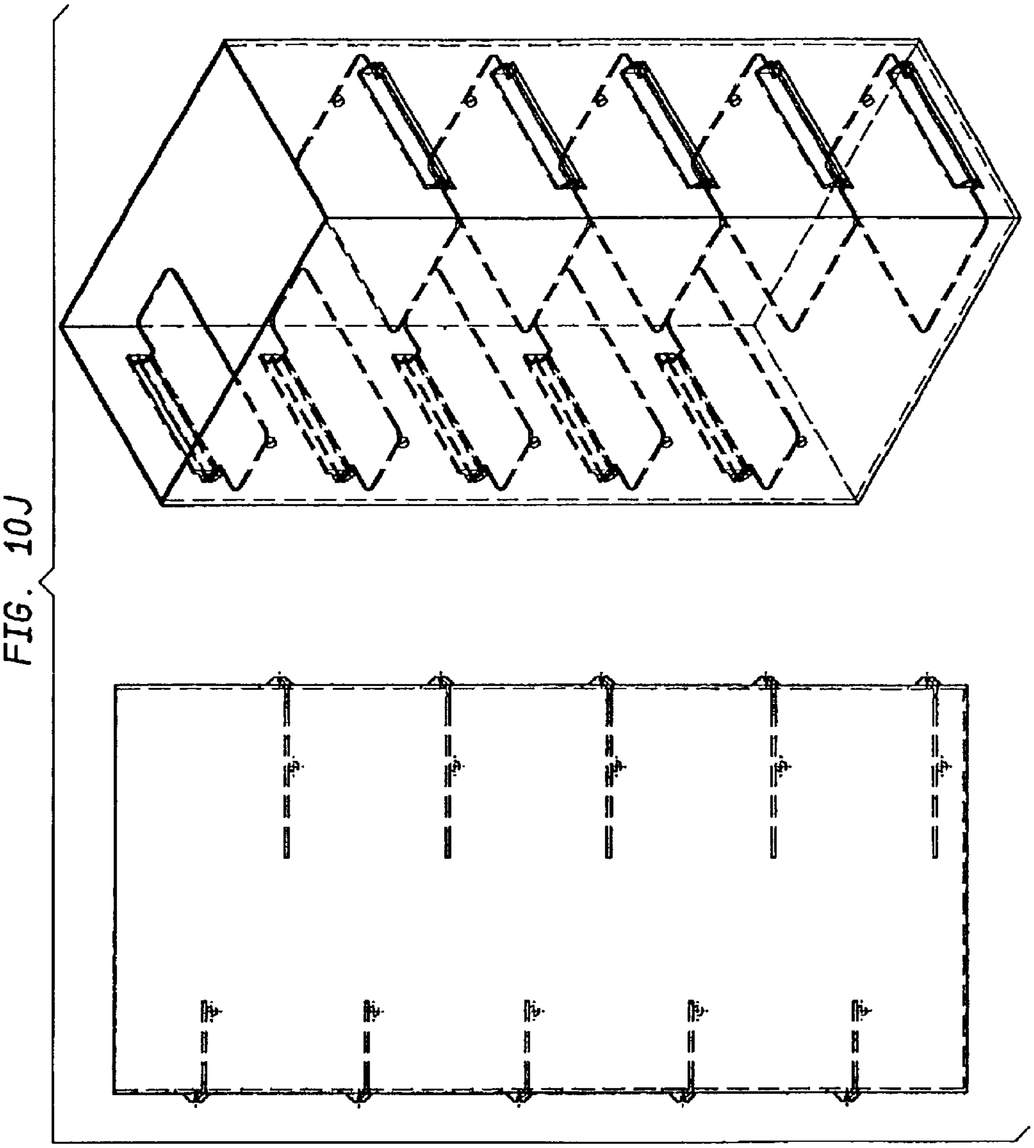

FIG. 10F shows cross section and perspective views of article storage bins similar to those of FIG. 10A, however the flaps are staggered in this embodiment. FIG. 10G illustrates another further embodiment which is similar to FIG. 10A, however having flaps on only one sidewall thereof. FIG. 10H, illustrates a further embodiment where article supporting flaps are formed as hinged shelves 1022. Dimples other protrusions 1024 are provided in a sidewall of the bin in order to prevent the hinged from swinging in one direction, in the illustrated embodiment, in the lower direction. Thus, hinged shelves 1022 function in a manner substantially similar to flaps 1010. FIG. 10I to substantially similar to FIG. 10J, however in this embodiment shelves and 1022 on only positions along one sidewall of the bin, and the shelves are provided with varying depths of protrusions into the interior of the bin. FIG. 10J, a substantially similar to FIG. 10I, however shelves 1022 are provided on opposite sidewall to the bin, and they are provided in a staggered opposed manner along the length of the bin.

Figure 11A:
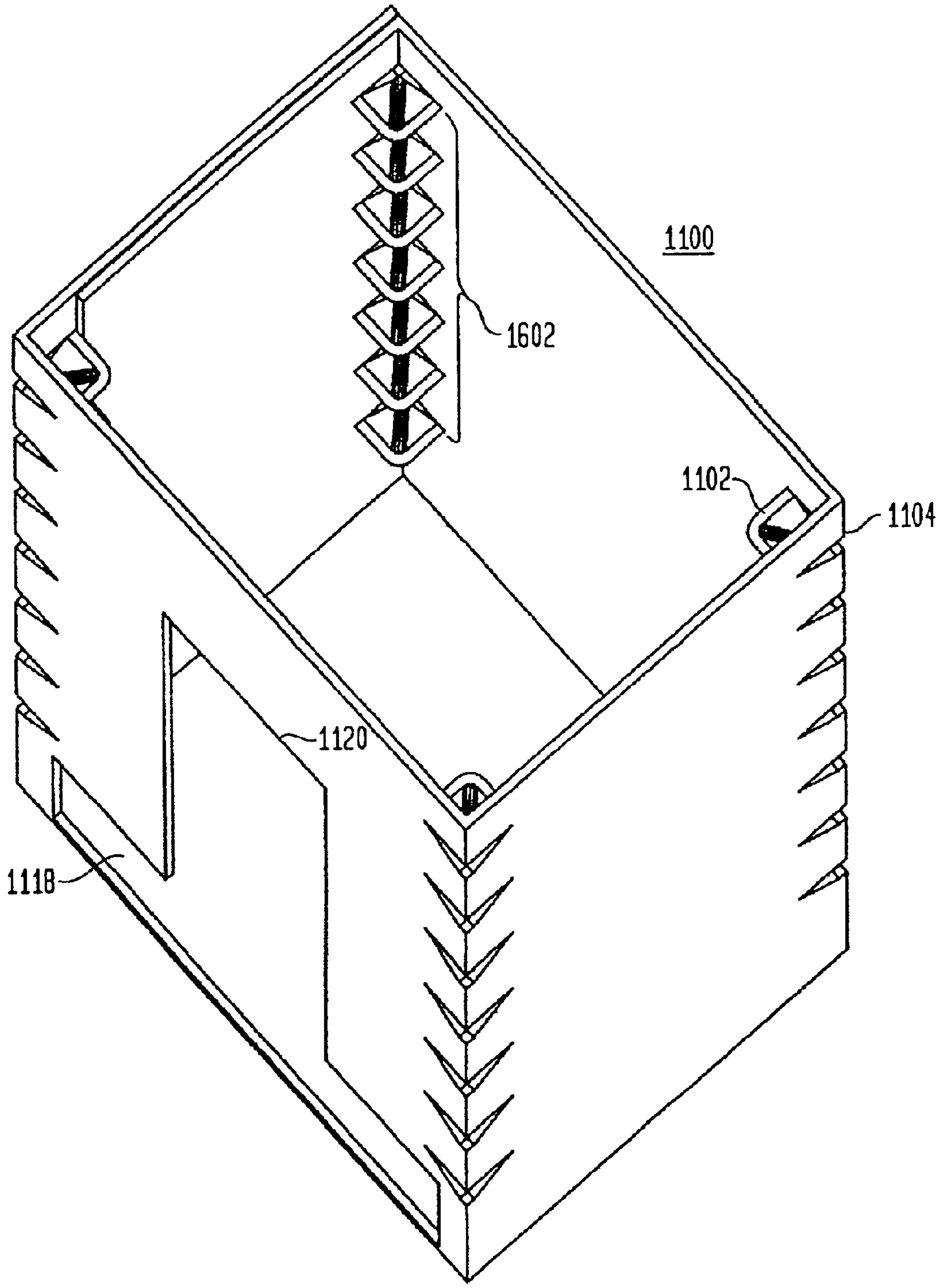
FIGS. 11*a* and 11*b* illustrate top and side perspective views of an alternative embodiment of an article storage bin constructed in accordance with the principles of the present invention.
Figure 11B:
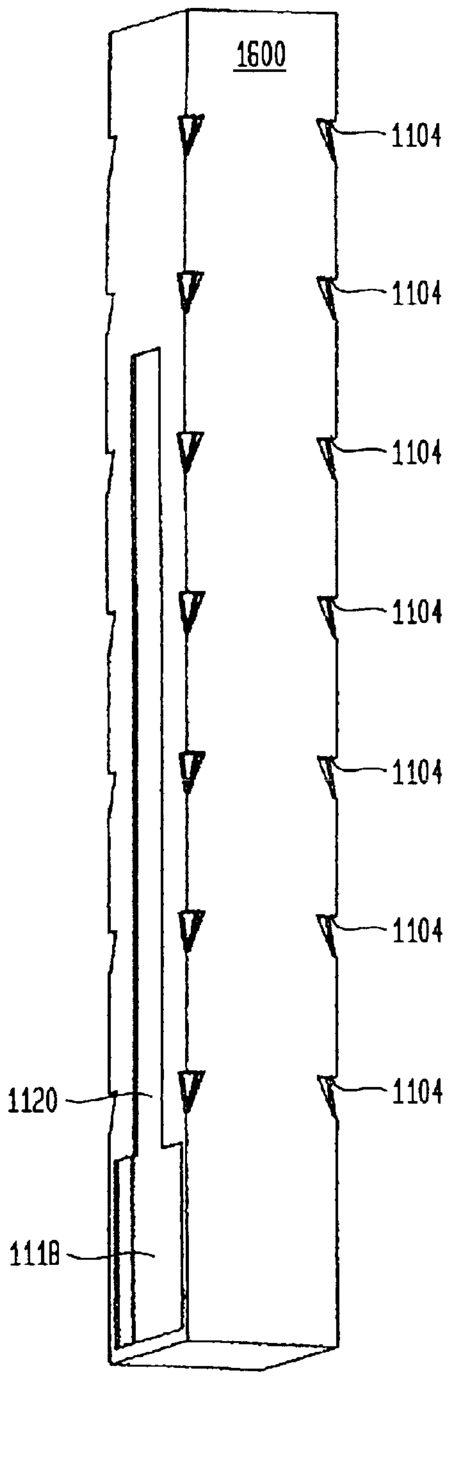

FIGS. 11*a* and 11*b* illustrate top and side perspective views of a further embodiment of an article storage bin constructed in accordance with the principles of the present invention. As shown therein, each bin 1100 as an exterior cross-section and general shape substantially the same as described above with respect to FIG. 10, however corner article supports 1102 are positioned along each of the corners of bin 1100. The article supports 1102 are formed by providing in a spaced manner along each of the corners of bin 1100, a series of slots 1104. Next, that portion of the corner of bin 1100 which is immediately below each slot 1104, is pressed so as to "intrude" into the interior of bin 1100. The top portion of each intrusion forms an article support 1102 which can support a corner of a flexible package in a manner similar to the support provided by tabs 1010 for the packages 1005, as shown in FIG. 10*d*, when a series of flexible packages are stored one on top of each other within bin 1100. Openings 1118 and 1120 are formed in the lower portion of bins 600 and function and a manner similar to openings 1018 in 1020 shown in FIG. 10, for loading bins 1100 with articles to be vended. Alternatively, the bottom portion of bins 1100 can be arranged similarly to the alternative embodiments noted above for bins 1000.

Figure 12A:
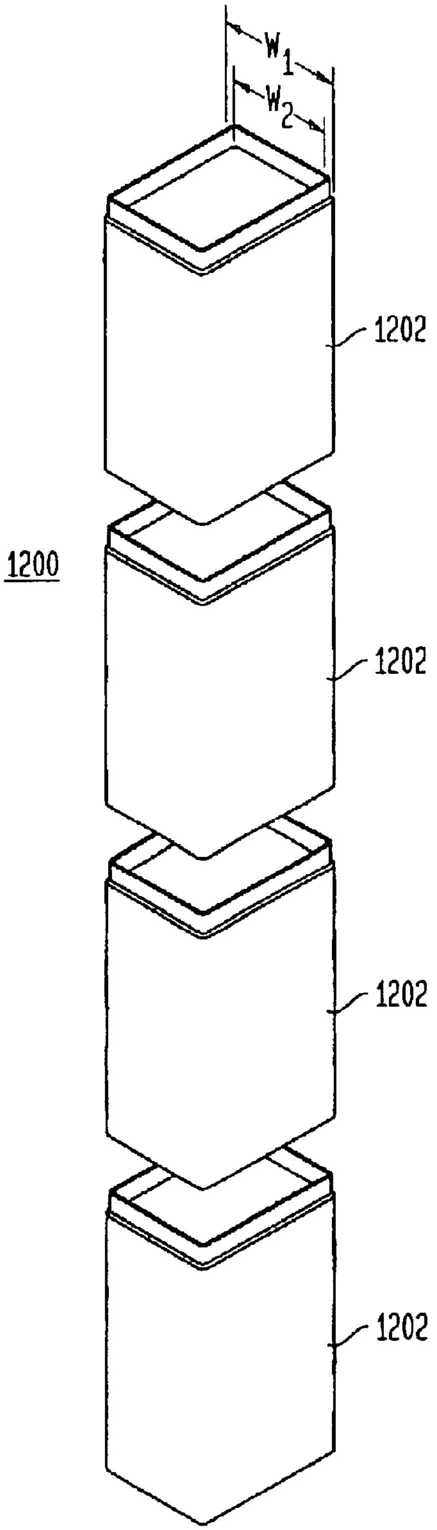
FIGS. 12*a* and 12*b* illustrate a further embodiment of an article storage bin constructed in accordance with the principles of the present invention, wherein the full height of the storage bin is formed by interlocking/stacked sectional bins.
Figure 12B:
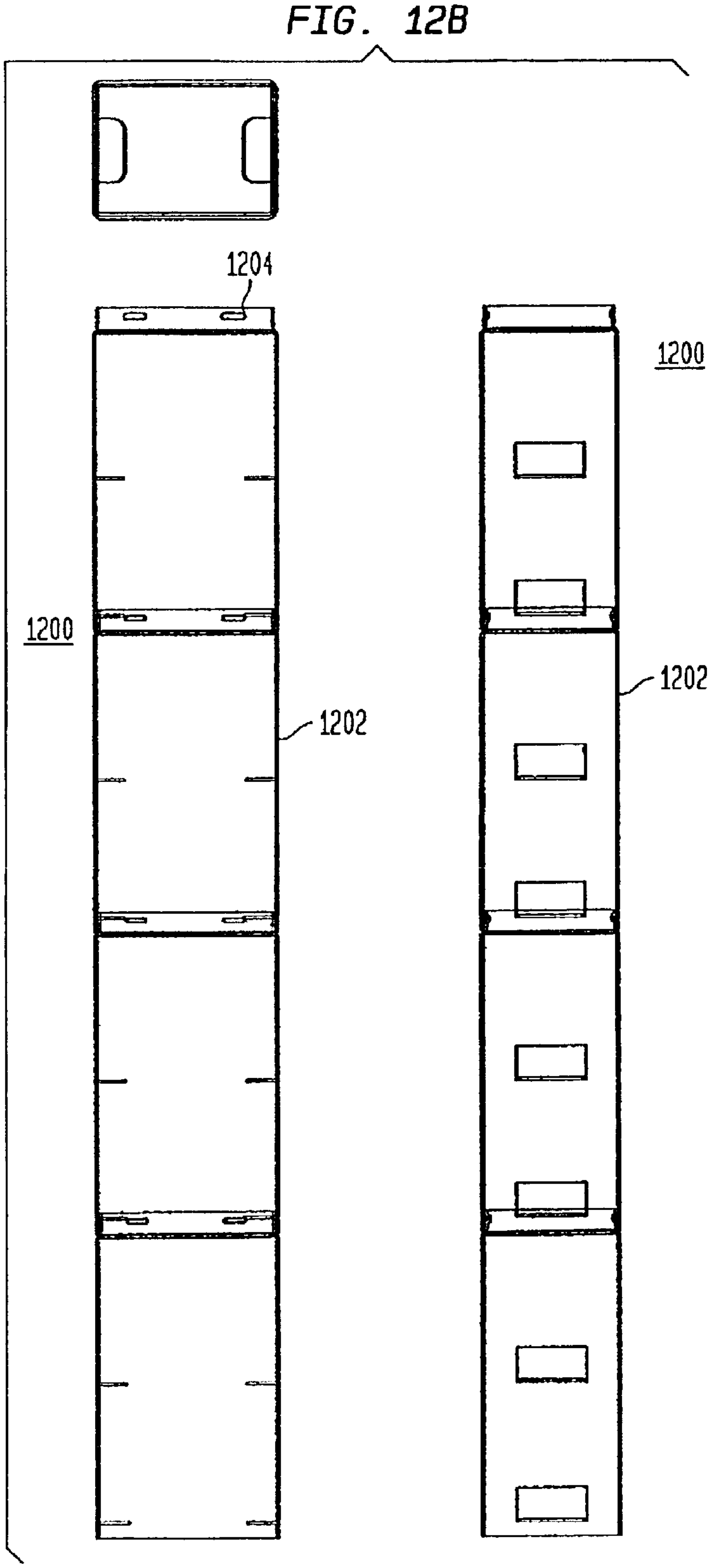

FIGS. 12*a* and 12*b* illustrate perspective views of further embodiments of an article storage bin constructed in accordance with the principles of the present invention, in order to facilitate an efficient refilling/filling of the storage bins with articles, and at the same time preserve a "first in/first out" (FIFO) refilling/filling scheme. As shown therein, the full height of the storage bin 1200 is formed by interlocking/stacking a plurality of sectional bins 1202. Each bin section 1202 includes a body portion having a standard length L and a standard width W1, and a top portion having a somewhat narrower width W2. W1 and W2 are dimensioned so that the top portion of one bin 1202 can be inserted into the bottom portion of an adjacent bin 1202. This arrangement facilitates FIFO loading of the vending machine, since each bin section 1202 can be prepackaged with goods by the manufacturer or by the service personnel at the warehouse, and upon servicing of the machine the empty and partially empty bins can be quickly and easily replaced with new bins full of fresh articles to be vended. Although not shown in FIG. 12, each bin section 1202 preferably includes "anti crush" intrusions (package supports), such as shown in FIGS. 5 and 6. Furthermore, a bottom portion of each bin section 1202, or for that matter, bins 1000 or 1100, may be open, or alternatively, if some support for the articles is desired during transportation of the bin, have a bottom which is removable, or a bottom formed by a flexible package support, such as tabs 1010 shown above. In this regard it is noted that the prepackaged bins/bin sections can be transported as a group in a container such as one of the forenoted macro boxes 219, from a warehouse or even from the article manufacturer, and the package supports of the present invention will serve to protect the integrity and quality of the products during such transport. The bin sections 1202 of FIG. 12*a* fit together with a friction fit, while the bin sections of FIG. 12*b* fit together with a snap or "detent" mechanism 1204 and for, which may comprise a slot or depression which is engaged by a biased flap or ball, such as conventionally used for providing a snap fit.

Figure 13A:
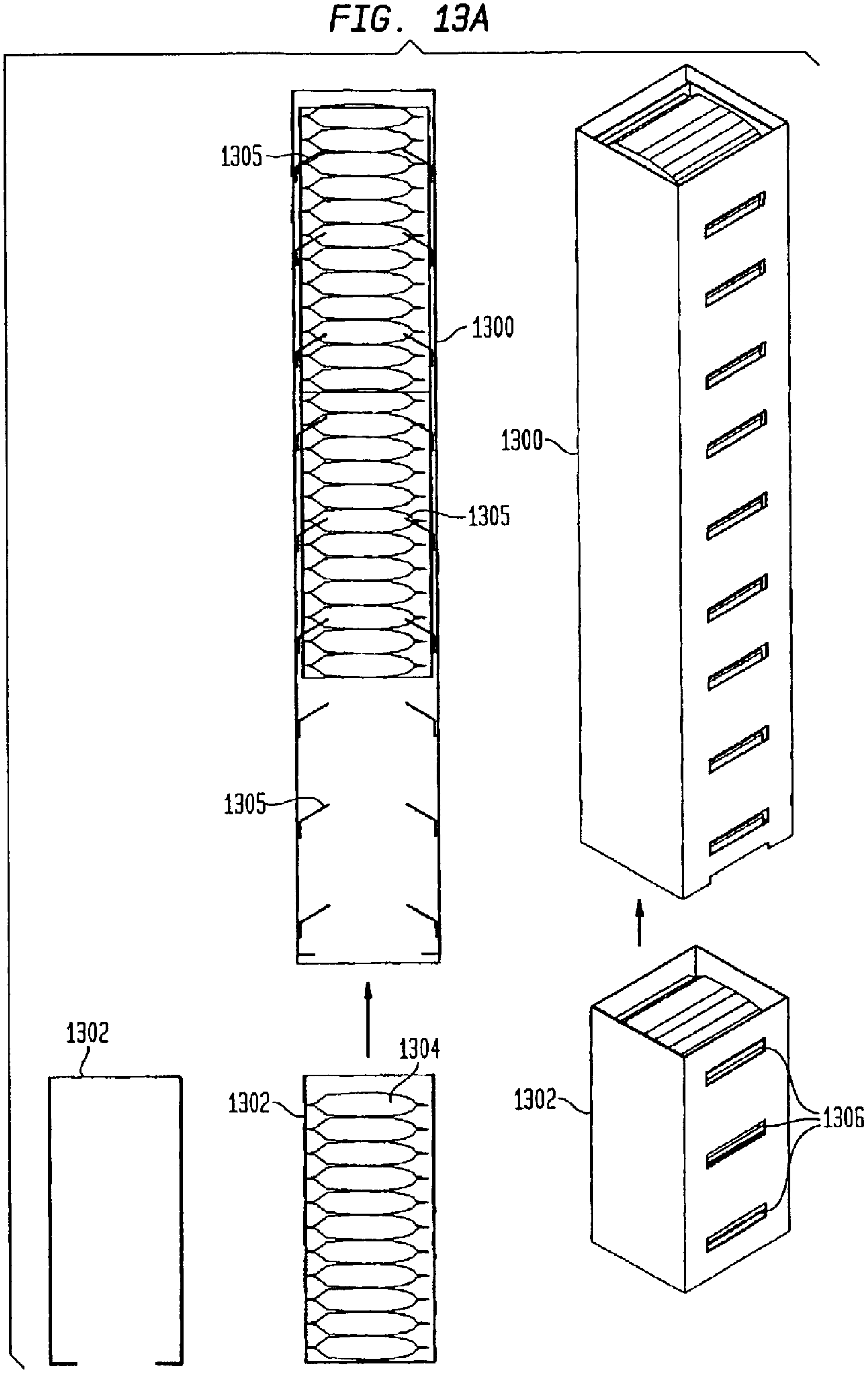
FIGS. 13*a* and 13*b* illustrate an even further embodiment of an article storage bin constructed in accordance with the principles of the present invention, wherein a "sleeve" of pre-packaged articles is used for loading a bin having a configuration such as shown in FIGS. 10 and 11.
Figure 13B:
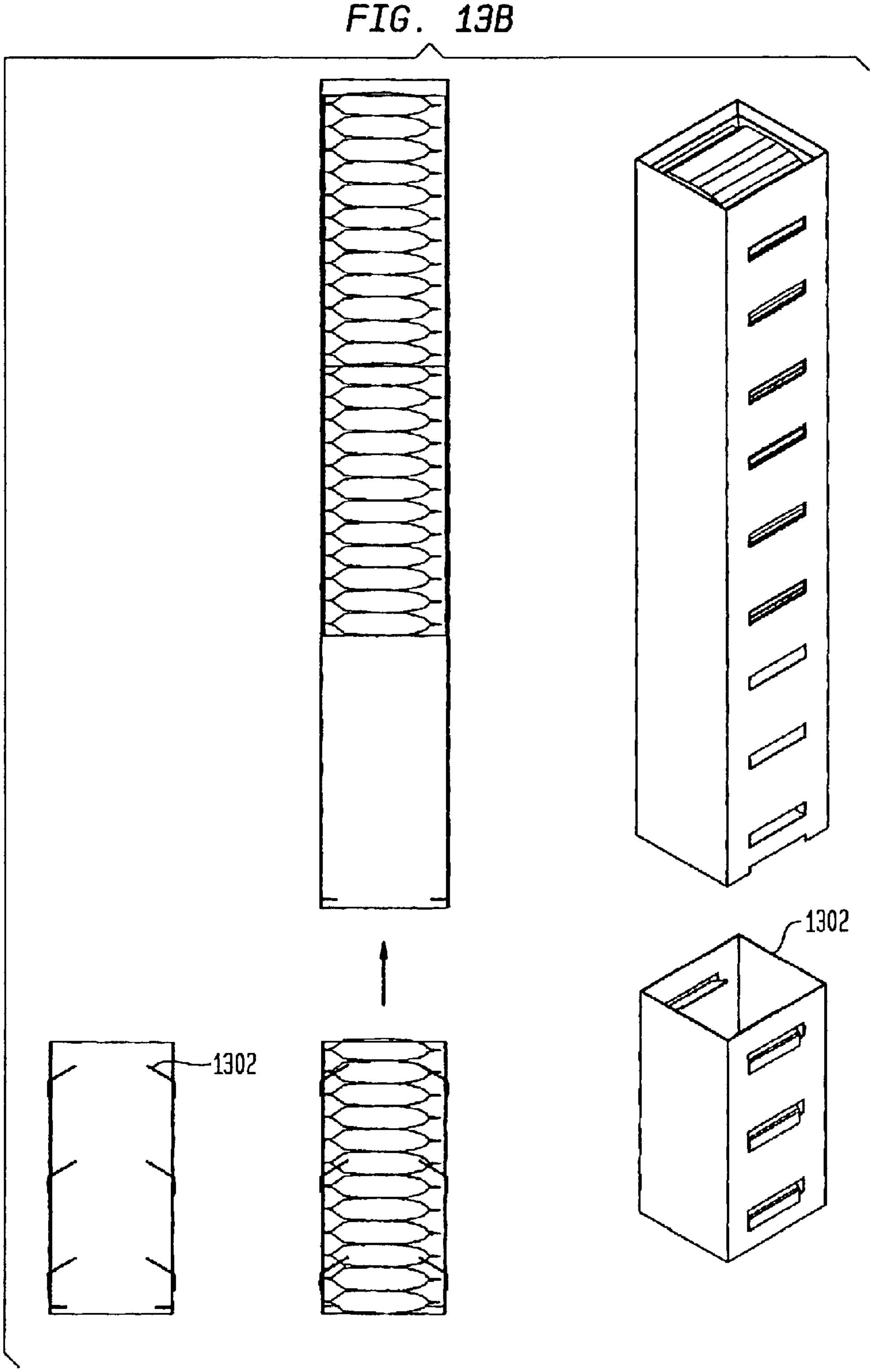
Figure 14:
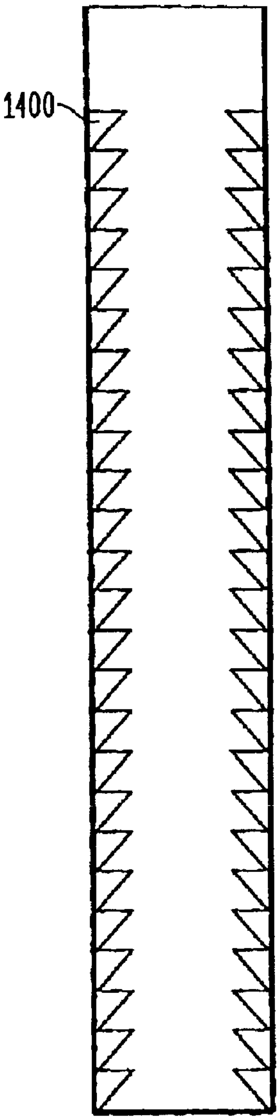
FIGS. 14, 16 and 15, 17 illustrate longitudinal cross section and top views of two further embodiments of article storage bins constructed in accordance with the principles of the present invention.
Figure 15:
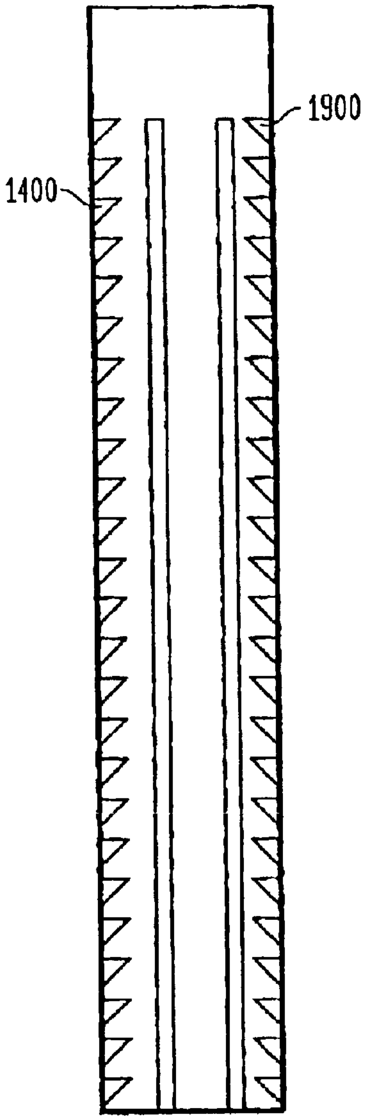
Figure 16:
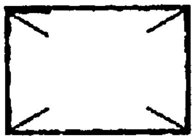
Figure 17:
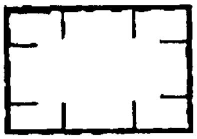

FIGS. 13*a* and 13*b* illustrate cross-section and perspective views of even further embodiments of article storage bin system constructed in accordance with the principles of the present invention, wherein a "sleeve" 1302 of pre-packaged articles 1304 is used for loading an article storage bin, such as one having a configuration as shown in FIGS. 10, 11 or 12. Each sleeve 1302 comprises a low-cost wrap, such as stiff paper, which encircles a pre-assembled group of articles. The sleeve 1302 can then be inserted into a storage bin through its open bottom (or e.g., the side loading opening 1020), for refilling/filling. The inserted sleeve of articles is then pushed upward in the bin, using the slot openings 1018 and 1020, to allow insertion of additional sleeves of articles, as appropriate, for completely refilling/filling the bin or bin section. In order to facilitate engagement of the edges of the articles within the sleeves by the flexible tabs 1305, or other package supports in the bins or bin sections, the sleeves have appropriate openings 1306 (in the illustrated embodiment on opposite sides thereof), dimension to allow the flexible tabs 1305 to contact and support the articles held therein. FIG. 13*b* illustrates cross-section and perspective views of a further embodiment similar to FIG. 13*a*, however sleeves 1302 include their along article supporting flaps 1302' therein. Alternatively, sleeves 1302 may merely be used for "releasing" a group of the articles into the bin in an efficient manner, and as the articles are introduced, the sleeve is removed. In a manner similar to what is noted above for bins 1000, 1100 or 1200, a bottom portion the each sleeve may be open, or alternatively, if some support for the articles is desired during transportation of the sleeve, have a bottom which is removable, or a bottom formed by a flexible package support, such as tabs 1010 shown above.

Many of the benefits of the inventions described herein could also be particularly useful in an article dispensing apparatus of the type having a refrigerated compartment, such as a chest freezer including various doors thereon (such as described for the ice cream dispenser in U.S. Pat. No. 5,240,139), in combination with the forenoted controls for creating and/or maintaining suction at the gripping end of the suction hose.

Figure 18:
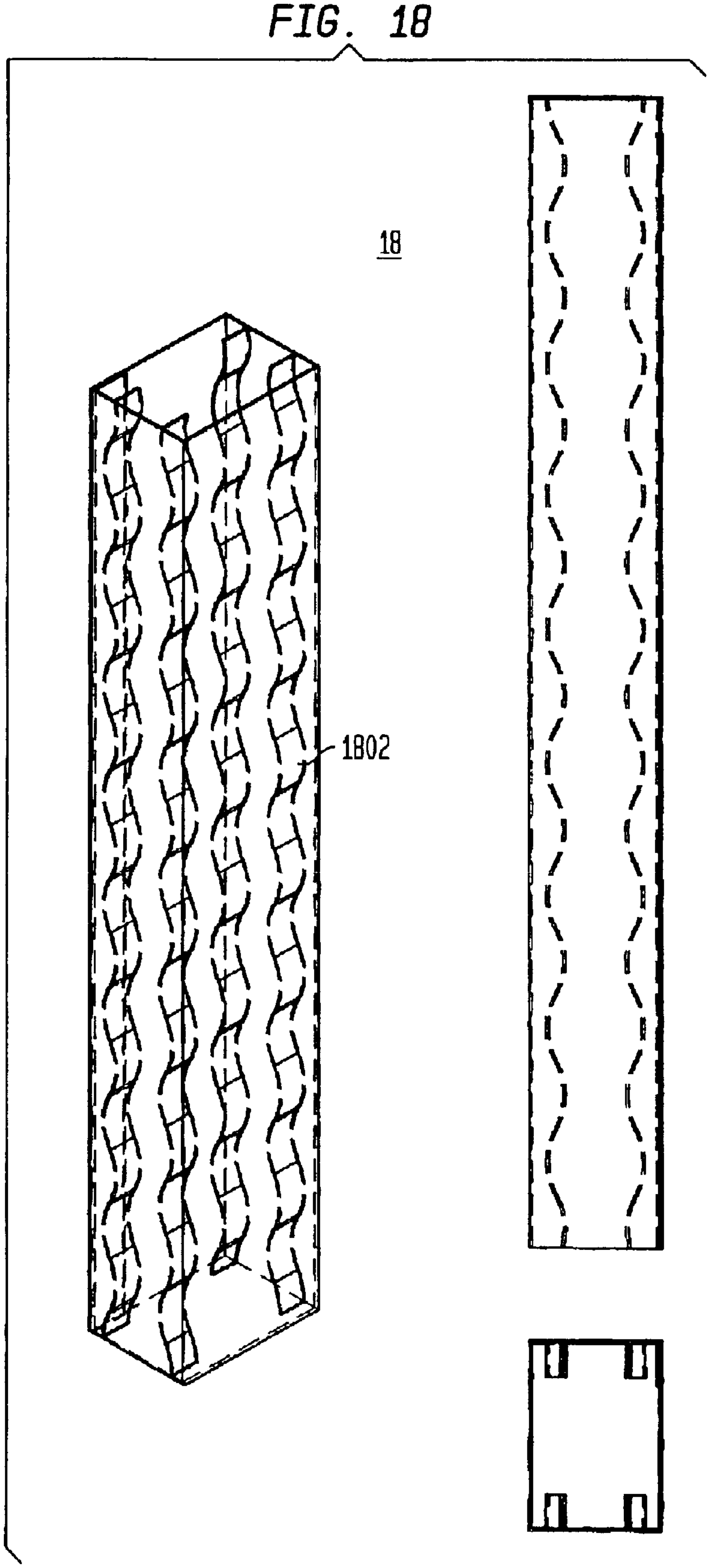
FIGS. 18–27 illustrate further useful embodiments in accordance with the invention.

While this invention has been particularly shown and described with reference to preferred embodiments thereof, it will be understood by those skilled in the art that various changes in form and details may be made therein without departing from the spirit and scope of the invention as defined by the appended claims. In fact, many such changes are already noted in this description. Those skilled in the art will recognize, or be able to ascertain using no more than routine experimentation, many equivalents to the specific embodiments of the invention described specifically herein. For example, although supports 1002 are indicated as being constructed of a flexible plastic, in fact other materials, such as cardboard, could be used. In the event that the thickness of the sidewalls of bins 1000 is insufficient to provide the above noted "biasing" effect, additional "flat strips" could be adhered to the underside of each hole to provide a desired "thickness". Such strips could be formed by a solid panel having a longitudinal shape corresponding with that of the inner side wall of a bin 1000, having cut-outs therein corresponding to the position and dimension of slots 1012, or a Even furthermore, instead of supports 1002 having flat tab portions 1010, the article supports could instead comprise "rod-like" intrusions into the bin, such as found in a brush. Additionally, instead of providing a separate element for forming supports 1002, bins 1000 may be manufactured using a multi-layer material, and tabs 1010 can be formed from an inner layer of the bin material. In an even further embodiment, the article intrusions/supports can comprise a plurality of longitudinally oriented strips 1900 of flexible material, such as polyethylene, having "steps" formed (such as by die-cutting) therein, as shown in FIGS. 14–17. Strips 1400 can be adhered to the inner corners (FIGS. 14 and 16) or walls (FIGS. 15 and 17) of the article storage bins as shown, and their "steps" function to at least partially support the weight of the articles stored therein. Furthermore, the shape of the inserts could have a wavy, sinusoidal-type pattern. Alternatively, the inside of the bin could itself have a profile which acts to support the product, such as an internal spring/flexible portion which may be extruded integrally with the formation of the bin walls, or such a piece 1000 which is manufactured separately and then added to the interior of the bin. FIG. 18, which illustrate a perspective, longitudinal cross section and top view of a further bin variation where article supports which herein comprise a wavy-shaped 2D panel 1802 formed/placed/adhered adjacent to the interior walls of the bins. Furthermore, although in the illustrated embodiments an article containment bin is shown which is rectangular in shape, other types of article containment techniques are consistent with the present invention. For example, article containment bins are not required to have 4 sides, especially in the event that they are not arranged in a vertical orientation; article containment bins can be slanted or even horizontal. In this case only three or even two wall portions may be required, however it may still be desirable, and it is possible to use, the anti crush techniques described above.

Figure 19:
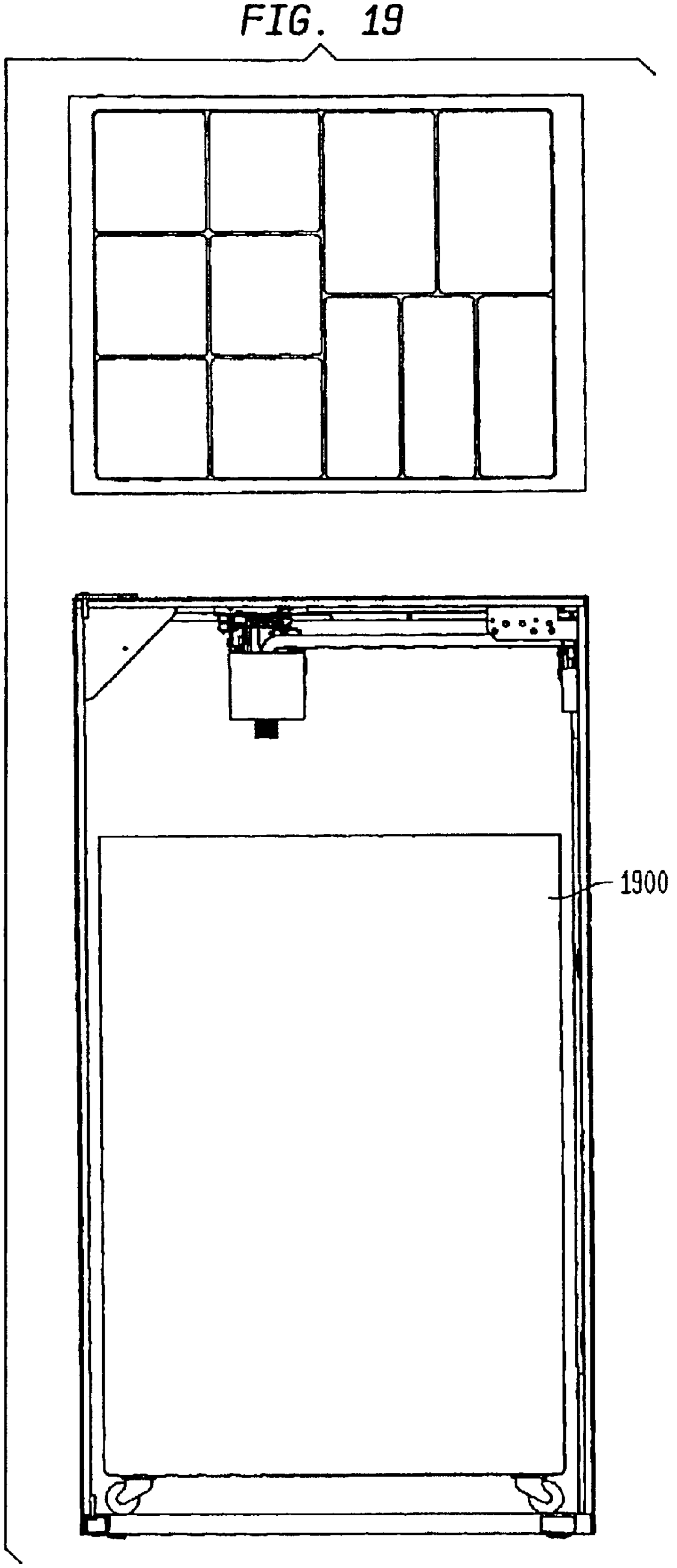

FIG. 19 illustrates a vending machine wherein a single bin container (macro bin) 1900 includes wheels in order to facilitate a complete "swap-out" of the contents of the storage area of the vending machine.

Figure 20:
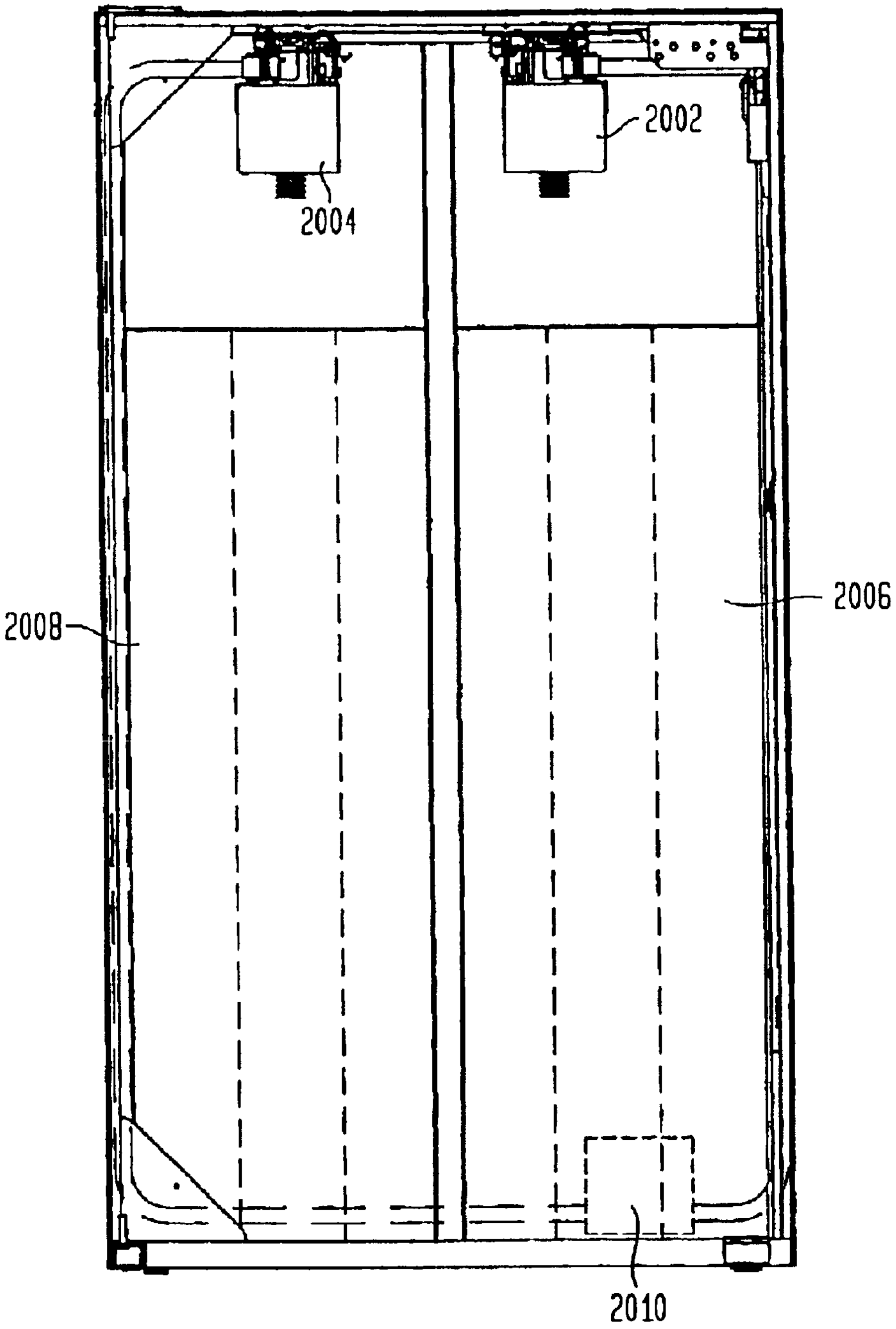

FIG. 20 illustrates an article handling/storage area combination wherein two article handlers 2002 and 2004 provide article handling for apparatus stored in two separate storage areas 2006 and 2008. A single source of suction 2010 can provide the suction needs for each of the individual article handlers. Area is 2006 and 2008 can both be an ambient environment, or some other environment, as will be apparent from the following Figures.

Figure 21:
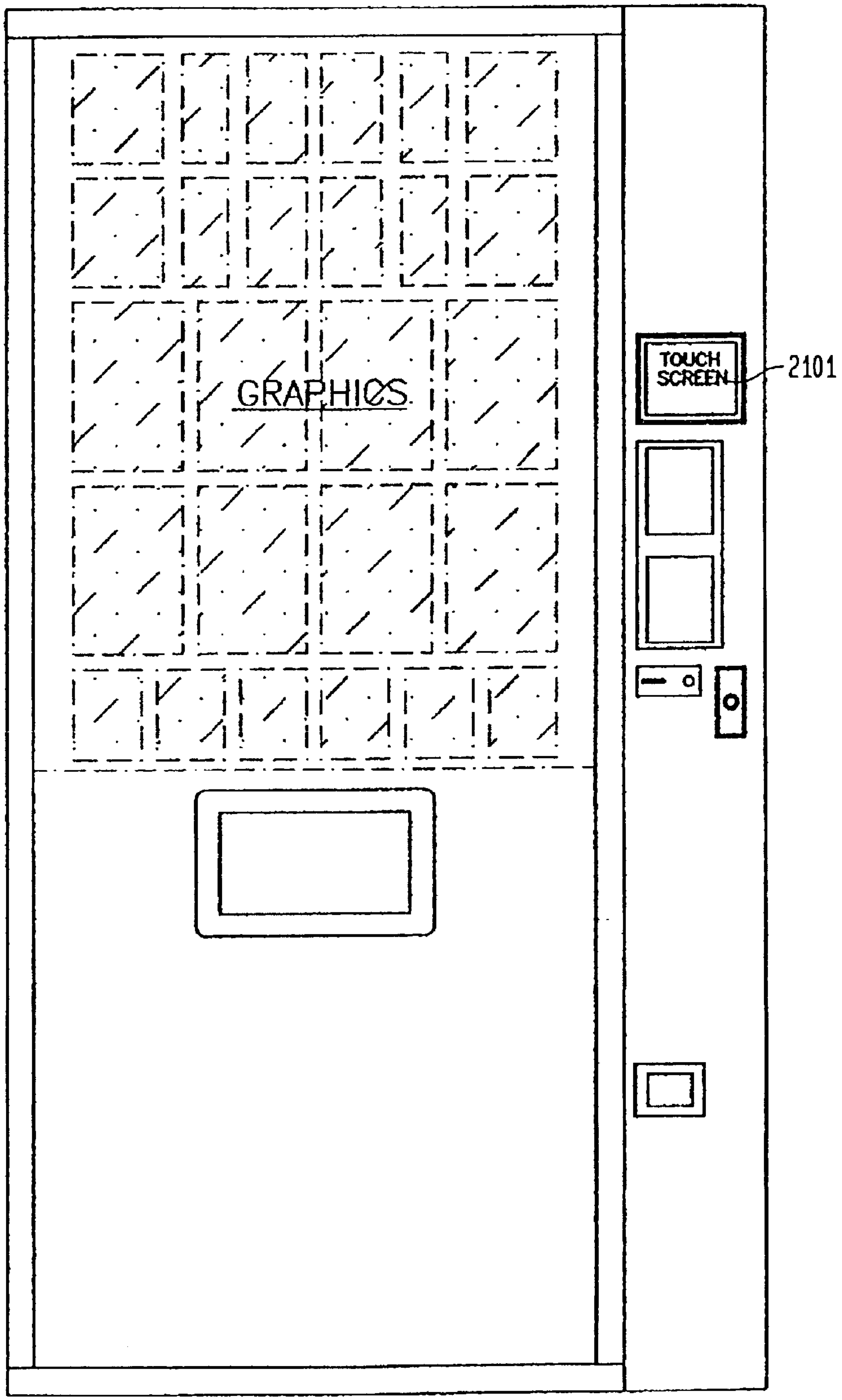

FIG. 21 illustrates a vending machine similar to that of FIG. 1, however, in place of the keypad portion of the user interface, a touch screen 2102 is provided.

Figure 22:
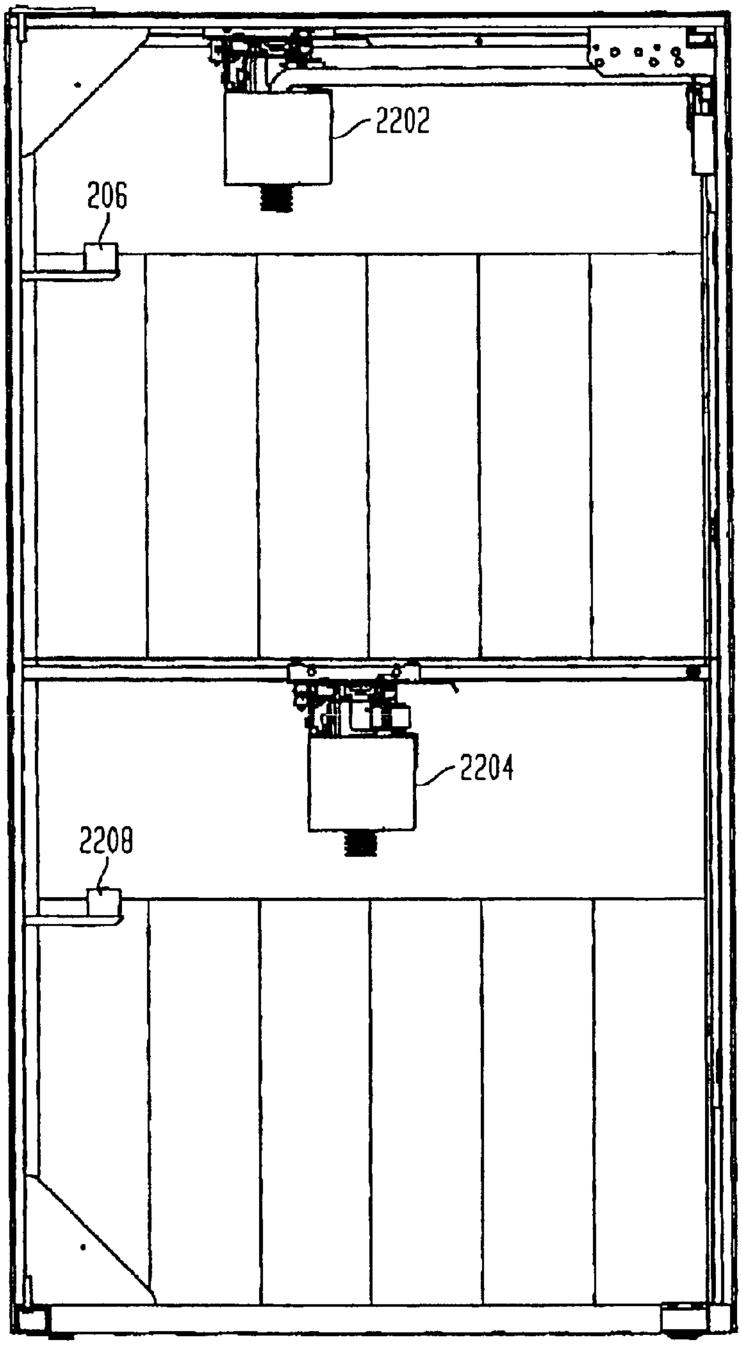
Figure 23:
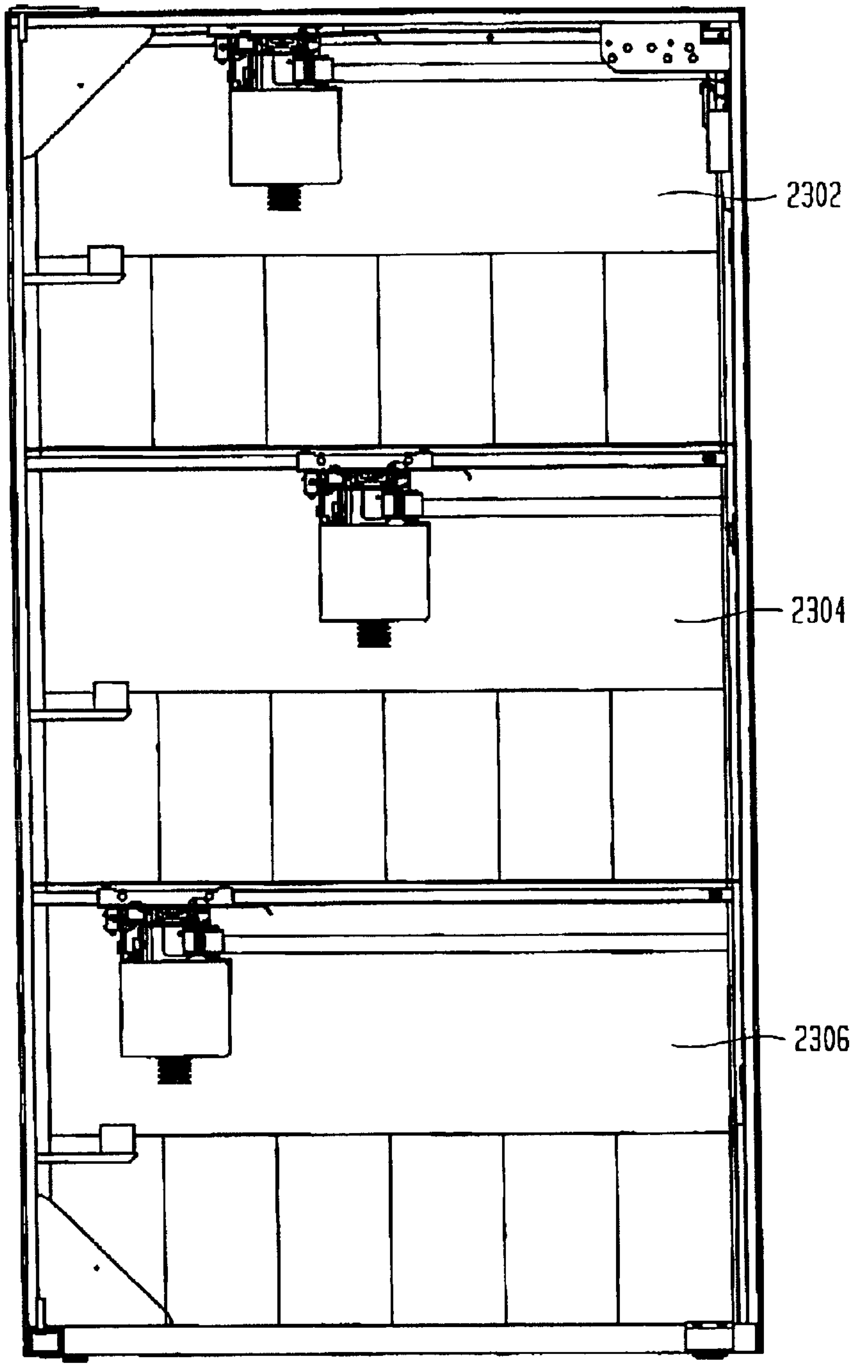

FIG. 22 illustrates an article handling/storage area combination wherein two article handlers 2202 and 2204 provide article handling for apparatus stored in two separate storage areas 2206 and 2208. A single or separate sources of suction can provide the suction needs for the individual article handlers. Area is 2006 and 2008 can both be an ambient environment, or some other application, one refrigerated and one, for example, ambient. A thermal separator, not shown, could be used in the refrigerated area. Individual article ID devices 2206 and 2208 are provided. FIG. 23 is substantially similar to FIG. 22, but illustrates the use of three vertically stacked storage areas 2302, 2304, 2306 and respective article handlers. These areas may provide a frozen, cooled, and ambient environment, respectively.

Figure 24:
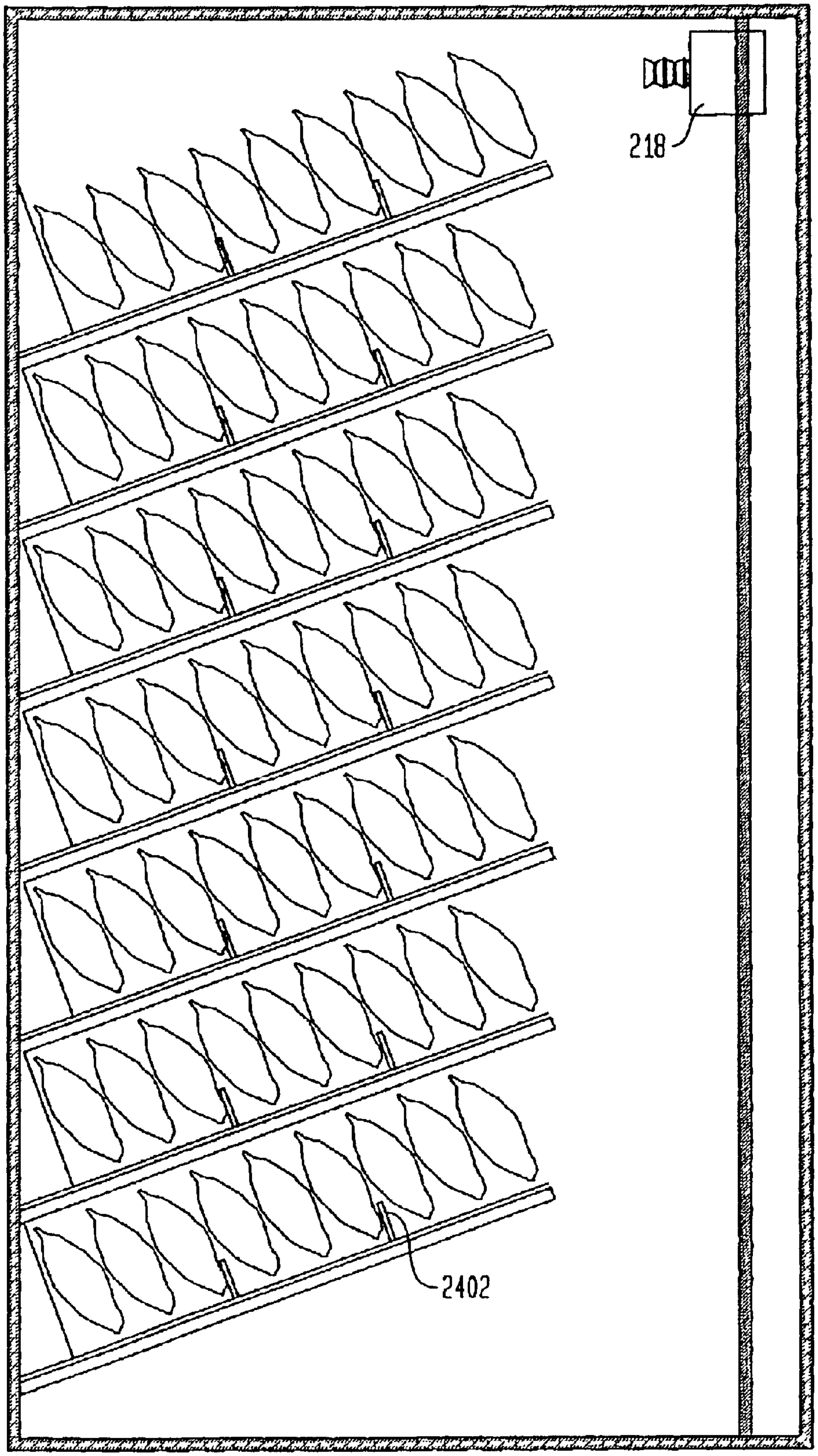
Figure 25A:
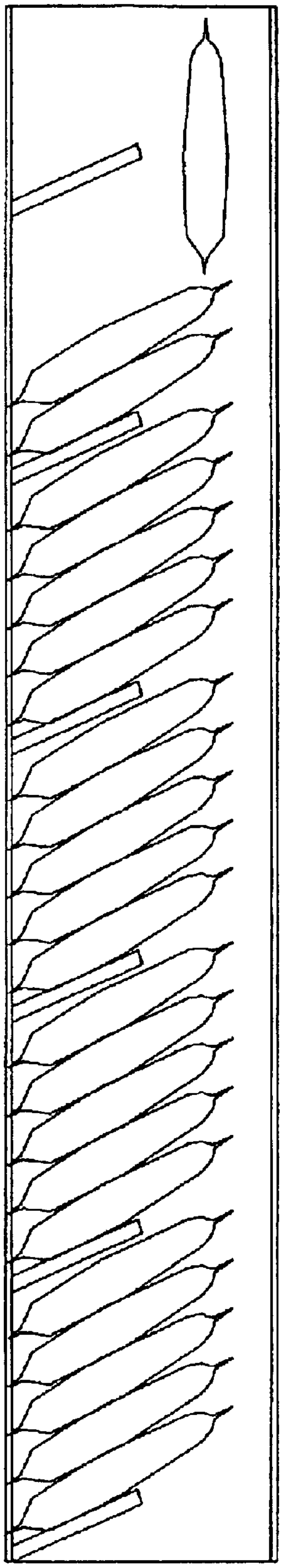
Figure 25B:
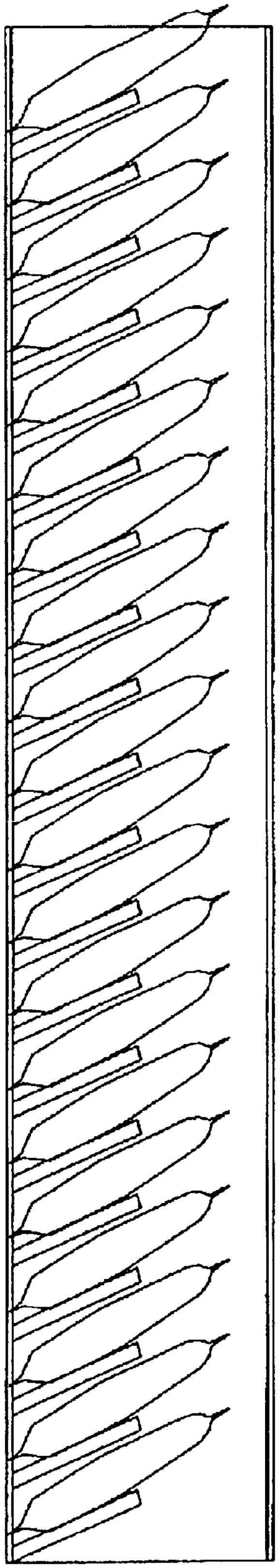

FIG. 24 illustrates an article dispenser embodiment where the stacks of articles are substantially horizontal and carriage 218 moves in a vertical plane in front of the dispensing end of the stacks. Note weight bearing supports 2402 are still useful in this embodiment, and do not present impediment to article removal by the pick up head. FIGS. 25*a* and 25*b* illustrate an article dispenser embodiment where the stacks of articles are vertical and the weight bearing supports are fixed. In FIG. 25*b* each article includes its own support.

Figure 26:
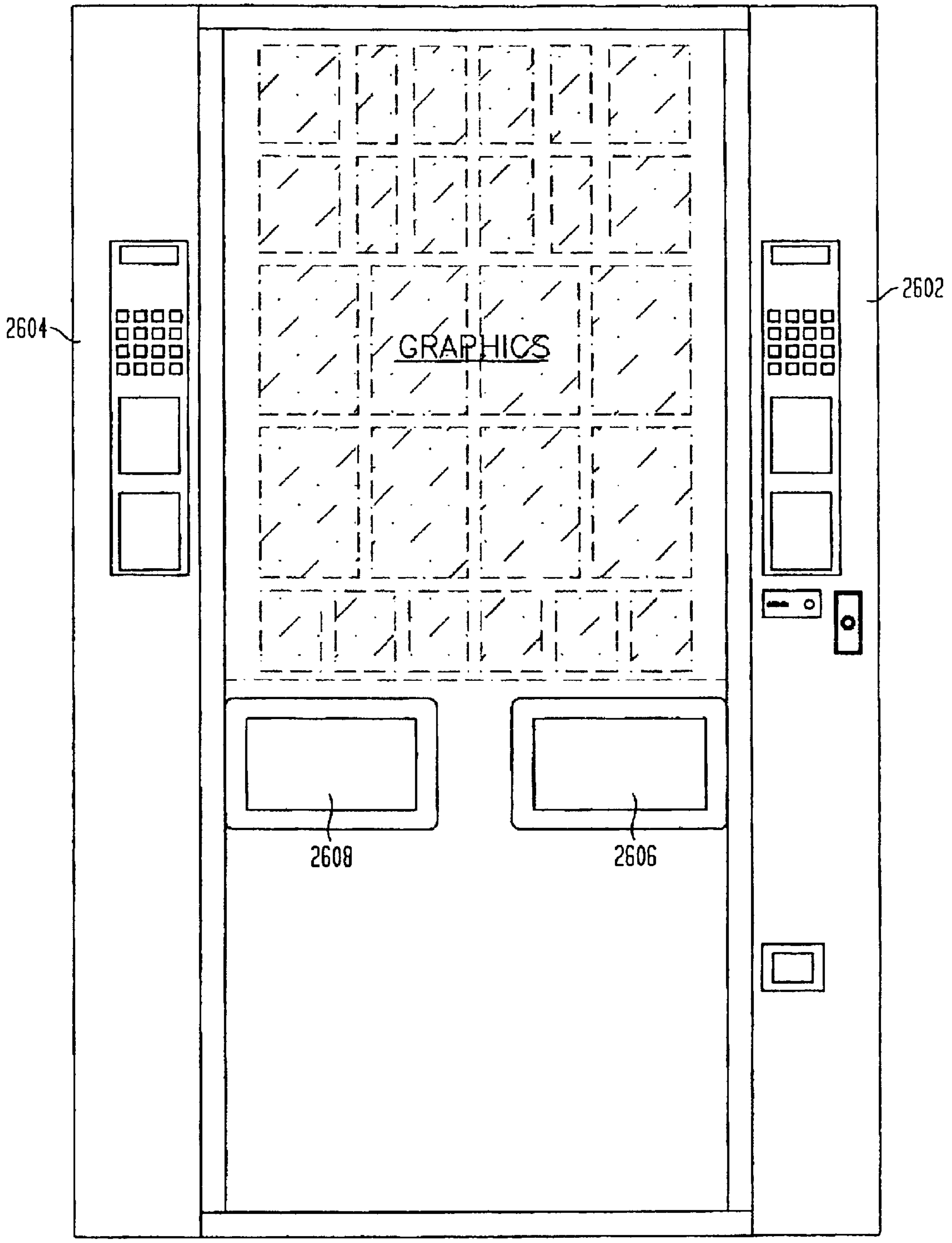

FIG. 26 illustrates an article dispenser embodiment having dual user interfaces 2602 and 2604 and delivery ports 2606 and 2608, respectively, which allow two users to simultaneously make payments and selections and receive products. The interior of this machine could be as shown in FIG. 20 or 22.

FIG. 27 illustrates various configurations for container 219, sometimes referred to as a macro box, because it holds multiple ones of bins 216 (useful for the purpose of "swapping" complete, or substantially complete, inventory/storage areas in an article dispenser. FIG. 19 illustrates wheels for the boxes. Box 2701 includes all equally sized bins, box 2702 includes two equally sized sub-boxes 2703 and 2704 (each of them including bins of varying sizes and shapes). In a similar manner, boxes 2705 and 2706 show boxes having 3 and 4 sub-boxes, respectively.

Furthermore, although substantially rectangular article storage bins have been described, circular/curved-walled bins can be used. It is also noted that although a suction providing air hose 220 has been disclosed in the described preferred embodiments, in fact a solid element having a gripper at its free and, such as a mechanically operated claw (or an electromagnetic device or even a self-contained suction generator), could also be used. Such equivalents are intended to be encompassed in the scope of the appended claims.

What is claimed is:

1. An article storage container, comprising a bin for storing in an a columnar manner, articles to be dispensed from a dispensing end of the bin, and at least one article supporting intrusion positioned inside the bin, and when a plurality of articles are stored in the bin and said bin is vertically positioned so that the longitudinal axis of the bin is substantially parallel to gravity, the dispensing end of the bin is oriented such that movement of the article for dispensing is in a direction opposed to gravity, and said intrusion functioning to provide load bearing support for the weight of the articles.

2. The article storage container of claim 1, including a plurality of said article supporting intrusions positioned in a spread manner along at least a portion of the length of the bin.

3. The article storage container of claim 2, wherein said article supporting intrusions comprise flexible tabs.

4. The article storage container of claim 2, wherein said flexible tabs are positioned in opposed pairs so as to intrude into the interior space of the bin from opposed walls of the bin.

5. The article storage container of claim 3, wherein said flexible tabs are formed integrally with the sidewalls of the bin.

6. The article storage container of claim 3, wherein said tabs have a resistance to movement in the dispensing direction which is less than its resistance to movement in a direction which is opposite to the dispensing direction.

7. The article storage container of claim 3, wherein said flexible tabs are part of an article support having a base secured to an outside wall of said bin, and having tab portions which extend through slots formed in the sides of the bins.

8. The article storage container of claim 2, wherein said bin has a generally rectangular cross-section, and said article supporting intrusions comprise a portion of a corner of each bin, bent inward so as to intrude into the interior thereof and function as a support for said articles.

9. An article retrieving apparatus, comprising:

a storage area for storing articles along at least one longitudinal axis in a storage bin;

an article extracting device including an end for selectively extracting an article from the storage bin; and a drive mechanism coupled to the article extracting device for moving the end thereof in a direction aligned with the longitudinal axis in the storage bin, wherein said bin comprises:

an elongated columnar enclosure having a cross-sectional shape adapted to surround the shape of articles intended to be stored therein, and a dispensing end of the enclosure providing access to the interior of said bin for extraction of said articles in a direction which is opposed to gravity; and at least one article supporting intrusion positioned inside the bin, said intrusion functioning to provide load bearing support for articles, when a plurality of articles are stored in the bin.

10. A vending machine for dispensing articles, comprising:

a housing for forming exterior sides, enclosing an interior volume, and forming an article delivery port for the article dispensing apparatus;

said interior volume including, a storage volume including at least one storage bin for storing articles to be dispensed in an a columnar manner, an article dispensing device for selectively extracting articles from the storage bin and providing them to said delivery port, and control apparatus for controlling said article dispensing device so as to move a selected article from a bin in said storage volume to the dispensing port, wherein said bin comprises:

an elongated columnar enclosure having a cross-sectional shape adapted to surround the shape of articles intended to be stored therein, and a dispensing end for providing access to the interior of said bin;

at least one article supporting intrusion positioned inside the bin, said intrusion having a resistance to movement in a direction in the bin toward the dispensing end which is less than their resistance to movement in a direction which is opposite to the dispensing end, the difference in resistance to movement being such that said intrusion functions to provide load bearing support for articles, when a plurality of articles are stored in the bin, yet not hinder their removal during dispensing from the bin.

11. An article dispensing apparatus, comprising:

a housing for forming exterior sides, enclosing an interior volume, and forming an article delivery port for the article dispensing apparatus;

said interior volume including, a storage volume including at least one storage bin for storing articles to be dispensed in an a columnar manner, an article dispensing device being controlled so as to selectively enter a dispensing end of the storage bin to extract a selected article therefrom by contacting the article and then moving the article against the effects of gravity until it is extracted from the dispensing end of the bin, and thereafter provide the article to said delivery port, and control apparatus for controlling said article dispensing device so as to move the selected article from inside a storage bin in said storage volume to the dispensing port, wherein said bin comprises:

an elongated columnar enclosure having a cross-sectional shape corresponding approximately to the shape of articles intended to be stored therein, and an open dispensing end for providing access to the interior of said bin;

at least one article supporting intrusion positioned inside the bin, and when said bin is vertically positioned so that the longitudinal axis of the bin is substantially parallel to gravity, and said intrusion functioning to provide load bearing support for articles stored in the bin.

12. An article storage container, comprising a bin for storing in an a columnar manner, articles to be dispensed from a dispensing end of the bin, and a plurality of article supporting intrusions positioned in a spaced manner along at least a portion of the length of the bin, said intrusions having a resistance to movement in a direction in the bin toward the dispensing end which is less than their resistance to movement in a direction which is opposite to the dispensing end, the difference in resistance to movement being such that said intrusions function to provide load bearing support for articles, when a plurality of articles are stored in the bin, yet not hinder their removal during dispensing from the bin.

13. An article storage container, comprising a bin for storing in an a columnar manner, an article to be dispensed from a dispensing end of the bin, said article being dispensed from inside the bin by passing the dispensing end in a direction substantially opposed to gravity, and a hinged article support coupled to the bin, said hinged article support having first and second orientations, said first orientation of said support functioning so as to provide load bearing relief for said article, and said second orientation of said support functioning so as to provide no load bearing relief for said article.

14. The article storage container of claim 13, wherein said hinged article support comprises a substantially rigid (1022) plate coupled in a hinged manner to a sidewall of said bin, said plate being substantially perpendicular to a longitudinal axis of the bin when said plate is in said first orientation, and said plate being substantially parallel with the longitudinal axis of the bin when said plate is in said second orientation.

15. The article storage container of claim 14, wherein when said plate is in said second orientation, an article in the bin positioned below the plate can pass the plate in an unobstructed manner in a direction toward the dispensing end.

16. The article storage container of claim 13, wherein said bin includes a blockage device for supporting a portion of said plate which is remote from its hinged coupling to the sidewall of the bin, when said plate is in said second position.

17. The article storage container of claim 16, wherein said plate is rectangular, and has a length in at least one of its axes which substantially spans opposed sidewalls in the interior of the bin when said plate is in said first position.

18. The article storage container of claim 13, wherein said bin comprises;

a plurality of bin segments, each bin segment comprising a pre-packaged group of at least one article to be positioned in an aligned manner with at least one other bin segment, so as to form at least one article storage column having an end corresponding to said dispensing end; and each bin segment having at least one hinged article support positioned towards an end of the bin segment which is opposed to the dispensing end.

19. The article storage container of claim 18, wherein said hinged article support comprises a substantially rigid plate (1022), said plate being substantially perpendicular to a longitudinal axis of the bin when said plate is in said first orientation, and said plate being substantially parallel with the longitudinal axis of the bin when said plate is in said second orientation.

20. An article dispensing apparatus, comprising:

a storage area for storing articles along at least one longitudinal axis in an article storage bin;

an article extracting device including an end for selectively extracting an article from a dispensing end of the article storage bin; and a drive mechanism coupled to the article extracting device for moving the end thereof into and then out of the dispensing end of the article storage bin and in a direction aligned with the longitudinal axis in the article storage bin, in order to extract a selected article from inside the article storage bin;

wherein said article storage bin comprises:

a bin for storing in an a columnar manner, at least two articles to be dispensed from a dispensing end of the article storage bin, said articles being dispensed from inside the article storage bin by passing the dispensing end in a direction opposed to gravity as a result of operation of said article extracting device, and a hinged article support coupled to the bin at a position so that at least one of said articles is positioned below said article support and one of said articles is positioned above said article support, said hinged article support being moveable between first and second endpoints of hinged movement, the orientation of said article support when at said first endpoint of hinged movement causing said hinged article support to obstruct the inside of said bin and provide load bearing support for said article which is positioned above said hinged article support, and the orientation of said article support when at said second endpoint of hinged movement causing said hinged article support to not obstruct the inside of said bin and thereby allow said article which is positioned below said hinged article support to pass thereby when being moved by said article extracting device toward the dispensing end of the bin, wherein said hinged article support is urged to move from said first to said second endpoint of hinged movement as a result of movement of said article extracting device.

21. The article storage bin of claim 20, wherein said hinged article support comprises a substantially rigid plate said plate being substantially perpendicular to a longitudinal axis of the article storage bin when said plate is at said first endpoint of hinged movement, and said plate being substantially parallel with the longitudinal axis of the article storage bin when said plate is at said second endpoint of hinged movement.

22. The article storage bin of claim 20, wherein said article storage bin comprises;

a plurality of article storage bin segments, each article storage bin segment comprising a pre-packaged group of articles to be positioned in an aligned manner with at least one other article storage bin segment, so as to form at least one article storage column having an end corresponding to said dispensing end;

each article storage bin segment having at least one hinged article support positioned towards an end of the article storage bin segment which is opposed to the dispensing end.

23. The article storage container of claim 22, wherein said hinged article support comprises a substantially rigid plate (1022), said plate being substantially perpendicular to the longitudinal axis of the article storage bin when said plate is at said first endpoint of hinged movement, and said plate being substantially parallel with the longitudinal axis of the article storage bin when said plate is at said second endpoint of hinged movement.

* * * * *